(12) United States Patent
Richards et al.

(10) Patent No.: US 8,316,453 B2
(45) Date of Patent: *Nov. 20, 2012

(54) DYNAMIC COMMUNITY GENERATOR

(75) Inventors: Phillip L. Richards, Charlotte, NC (US); David M. Andersen, Charlotte, NC (US); Chadwick R. Renfro, Dallas, TX (US); Christopher P. Higgins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/509,241

(22) Filed: Jul. 24, 2009

(65) Prior Publication Data

US 2010/0281512 A1 Nov. 4, 2010

Related U.S. Application Data

(63) Continuation-in-part of application No. 12/147,824, filed on Jun. 27, 2008.

(51) Int. Cl.
G06F 7/04 (2006.01)
H04L 29/06 (2006.01)
(52) U.S. Cl. ............ 726/26; 726/1; 726/2; 726/27
(58) Field of Classification Search .............. 726/1, 2, 726/26–28
See application file for complete search history.

(56) References Cited

U.S. PATENT DOCUMENTS

| | | | | |
|---|---|---|---|---|
| 6,023,765 | A * | 2/2000 | Kuhn | 726/4 |
| 6,321,334 | B1 * | 11/2001 | Jerger et al. | 726/1 |
| 7,284,000 | B2 * | 10/2007 | Kuehr-McLaren et al. | 1/1 |
| 7,624,424 | B2 * | 11/2009 | Morita et al. | 726/1 |
| 7,761,905 | B2 * | 7/2010 | Kern | 726/2 |
| 7,930,197 | B2 * | 4/2011 | Ozzie et al. | 705/7.11 |
| 8,020,191 | B2 * | 9/2011 | Bertino et al. | 726/1 |
| 2002/0144142 | A1 * | 10/2002 | Shohat | 713/200 |
| 2003/0088786 | A1 * | 5/2003 | Moran et al. | 713/201 |
| 2004/0025048 | A1 * | 2/2004 | Porcari et al. | 713/200 |
| 2004/0250120 | A1 | 12/2004 | Ng | |
| 2005/0138061 | A1 | 6/2005 | Kuehr-McLaren et al. | |
| 2005/0138419 | A1 * | 6/2005 | Gupta et al. | 713/201 |
| 2005/0138420 | A1 * | 6/2005 | Sampathkumar et al. | 713/201 |
| 2005/0216745 | A1 | 9/2005 | Speare et al. | |
| 2006/0089932 | A1 * | 4/2006 | Buehler et al. | 707/9 |
| 2006/0136991 | A1 * | 6/2006 | Kern | 726/2 |
| 2007/0143859 | A1 | 6/2007 | Ogi et al. | |
| 2007/0244899 | A1 | 10/2007 | Faitelson et al. | |
| 2008/0109897 | A1 * | 5/2008 | Moran et al. | 726/19 |
| 2008/0168063 | A1 | 7/2008 | Whitson | |

(Continued)

FOREIGN PATENT DOCUMENTS

GB 2461160 A1 12/2009

(Continued)

OTHER PUBLICATIONS

Utility U.S. Appl. No. 12/147,824, filed Jun. 27, 2008.

(Continued)

*Primary Examiner* — Linglan Edwards

(74) *Attorney, Agent, or Firm* — Moore & Van Allen, PLLC; Padowithz Alce

(57) ABSTRACT

Embodiments of the invention are directed to systems, methods, and computer program products configured to determine communities within an organization dynamically based on the distribution of entitlements within the organization.

24 Claims, 29 Drawing Sheets

U.S. PATENT DOCUMENTS

| | | | |
|---|---|---|---|
| 2008/0288330 A1 | 11/2008 | Hildebrand et al. | |
| 2008/0301780 A1* | 12/2008 | Ellison et al. | 726/4 |
| 2008/0307486 A1* | 12/2008 | Ellison et al. | 726/1 |
| 2008/0320549 A1* | 12/2008 | Bertino et al. | 726/1 |
| 2009/0125382 A1* | 5/2009 | Delepet | 705/10 |
| 2009/0144802 A1* | 6/2009 | Tillery et al. | 726/1 |
| 2010/0131896 A1* | 5/2010 | Fitzmaurice et al. | 715/811 |

FOREIGN PATENT DOCUMENTS

| | | |
|---|---|---|
| WO | WO 2006/131906 A2 | 12/2006 |

OTHER PUBLICATIONS

Utility U.S. Appl. No. 12/509,244, filed Jul. 24, 2009.
GB Search Report dated Oct. 29, 2010 for GB Application No. GB1012234.9.
GB Search Report dated Nov. 12, 2010 for GB Application No. GB 1012250.5.
UK Preliminary Examination and Search Report mailed Sep. 17, 2009 for GB Application No. GB0910444.9.

* cited by examiner

| Run Analysis | ☑ |
| Hier Level (Community) | 4 |
| Community Membership Req (Uncommon Entitlement Threshold) | 2 |
| Friend (Normal Entitlement Threshold) | 5 |
| Input file | |
| ○ full_gjpbc_access.csv | |
| ● vm_access.csv | |
| Debug | ☐ |

Enter information

| Name | Community | Platform |
|---|---|---|
| Individual | FNVS | DEDMZNBM010 |
| | | DEDMZWWWAS01 |
| | | DEDMZWWWAS02 |
| | | DEDMZWWWAS03 |
| | | DEDMZWWWAS04 |
| | | DWDMZNBM010 |
| | | DWDMZWWWAS01 |
| | | DWDMZWWWAS03 |
| | | HPRTXCSC01 |

FIG. 10c

| LIKELIHOOD RATIO | COUNT IN COMMUNITY | COUNT OUTSIDE COMMUNITY | PERCENT IN COMMUNITY | PERCENT OUTSIDE COMMUNITY | ENTITLEMENT NAME |
|---|---|---|---|---|---|
| 582.35 | 27 | 15 | 59% | 0% | ENTITLEMENT A |
| 542.59 | 31 | 63 | 67% | 0% | ENTITLEMENT B |
| 263.41 | 23 | 308 | 50% | 0% | ENTITLEMENT C |
| 186.41 | 9 | 17 | 20% | 0% | ENTITLEMENT D |
| 108.38 | 5 | 1 | 11% | 0% | ENTITLEMENT E |
| 108.38 | 5 | 1 | 11% | 0% | ENTITLEMENT F |
| 86.38 | 4 | 0 | 9% | 0% | ENTITLEMENT G |
| 86.70 | 4 | 1 | 9% | 0% | ENTITLEMENT H |
| 16.42 | 1 | 111 | 2% | 0% | ENTITLEMENT I |
| 16.32 | 1 | 114 | 2% | 0% | ENTITLEMENT J |
| 15.83 | 1 | 128 | 2% | 0% | ENTITLEMENT K |
| 13.86 | 1 | 203 | 2% | 0% | ENTITLEMENT L |
| 13.15 | 1 | 224 | 2% | 0% | ENTITLEMENT M |
| 11.74 | 1 | 262 | 2% | 0% | ENTITLEMENT N |
| 0.94 | 2 | 1806 | 4% | 1% | ENTITLEMENT O |
| 0.81 | 3 | 2771 | 7% | 8% | ENTITLEMENT P |
| 0.73 | 3 | 3022 | 7% | 9% | ENTITLEMENT Q |
| 0.67 | 3 | 3384 | 7% | 10% | ENTITLEMENT R |
| 0.42 | 2 | 3486 | 4% | 10% | ENTITLEMENT S |
| 0.23 | 3 | 9915 | 7% | 29% | ENTITLEMENT T |

FIG. 14

DYNAMIC COMMUNITY GENERATOR

CROSS-REFERENCE TO RELATED APPLICATION

This application is a continuation-in-part of co-pending patent application Ser. No. 12/147,824, filed Jun. 27, 2008, the entire disclosure of which is incorporated herein by reference.

FIELD

In general, embodiments of the invention relate to systems, methods, and computer program products for monitoring and/or controlling access to resources within an organization.

BACKGROUND

Within any organization, whether it is a large financial institution or other national or international business entity, a non-business entity, a governmental entity, or some other entity, it is important to monitor and control which members of the organization have access to which of the organization's information and resources as well as the types of access granted to each member. For example, in a banking institution certain people should have access to customer account information while others should not. Of these people with access to customer account information, some should have both read and write access while others should only have read access.

Other examples of access to resources within an organization that may need to be closely monitored include such things as access to customer and employee confidential information, access to different software applications and profiles, access to areas of a building or other physical or virtual structures, and the like. The different access rights granted to members of an organization are generally referred to herein as "entitlements."

Traditional techniques for monitoring and controlling the distribution of entitlements generally involve persons within the organization periodically reviewing the entitlements assigned to each individual member of the organization. Such traditional techniques pose significant problems. Perhaps the most significant problem is the fact that it takes a significant amount of an organization's resources to individually monitor and manage the entitlements of each member of the organization.

Specifically, large organizations can have tens or even hundreds of thousands of employees and millions of potential entitlements that need to be managed. Furthermore, each member is typically assigned numerous entitlements and, as such, there may be many millions of different entitlement combinations existing within the organization at any one time. Managing so many combinations of entitlements can be a monumental, if not impossible task, using traditional entitlement management techniques. The distribution of entitlements within an organization, however, is so important for both operation and compliance reasons that it must be monitored and controlled.

Additional confusion results when members transition to new roles within the organization. These transitioning members often require new entitlements to be able to operate effectively in their new roles, but they also may need their old entitlements for some period of time after their transition. If not properly managed, a person that transitions within the organization several times may accumulate a long line of legacy entitlements from previous roles in the organization. Such legacy entitlements may not be useful to the person any longer and can, in fact, create security risks or compliance issues if not properly monitored. For example, certain internal or external rules and regulations may require that one person not have access to entitlement "A" and entitlement "B." If a person who required access to entitlement A transitions within the organization several times and ends up in a role where he requires access to entitlement B but still has a access to entitlement A from his earlier role, the rules and regulations would be violated.

Confusion regarding the dissemination of entitlements may also arise any time a new system or technology is implemented since the entitlement administrators may not be aware of who needs access to the new system or technology and who can have the old system or technology entitlements removed. Other costs may also arise out of poor management of entitlements. For example, where the entitlements include access to software, improper monitoring and control of entitlements can result in greater licensing payments being paid to the software provider than is necessary. More specifically, the organization may pay a periodic payment to the software provider for each member of the organization that as access to the software. If members of the organization have access to the software but do not use or need the software any longer due to a change in job function or a change in systems, then the organization can save money in licensing payments if it can recognize the existence of such legacy access to the software.

A good entitlement management system should also be able to anticipate which entitlements a new employee or person transitioning into a new role will need to perform their job effectively. Traditional systems cannot anticipate needs effectively since the people managing the entitlements usually do not have intimate knowledge regarding the new employee's job function and which entitlements are needed for that job function. Even the new employee or the person transitioning into the new role will usually not know which entitlements they need because they may not know which entitlements are available. For all these reasons, organizations desire more efficient and accurate systems for managing the distribution of entitlements.

SUMMARY

Embodiments of the invention are generally directed to systems, methods, and computer program products configured to determine communities within an organization dynamically based on the distribution of entitlements within the organization. These dynamic communities can then be used to determine the appropriateness of entitlements within the organization.

For example, embodiments of the invention provide a system having a memory device and a processing device communicatively coupled to the memory device. The memory includes, stored therein, information regarding a plurality of entitlement-eligible entities and information regarding one or more entitlements currently associated with each entitlement-eligible entity. The processing device is configured to determine different communities of entitlement-eligible entities based on a review of the one or more entitlements currently associated with each entitlement-eligible entity. In some embodiments of the system, the processing device is configured to determine a community of entitlement-eligible entities based on a review of the one or more entitlements that each entitlement-eligible entity has in common with other of the plurality of entitlement-eligible entities.

In some embodiments of the system, for each combination of two entitlement-eligible entities within the plurality of entitlement-eligible entities, the processing device is configured to compute a correlation number representing how well the entitlements associated with one of the two entitlement-eligible entities correlate with the entitlements associated with the other of the two entitlement-eligible entities. The processing device can then determines a community of entitlement-eligible entities based on the correlation number. In some such embodiments, the processing device is configured to compute the correlation number as a function of a number of entitlements that the two entitlement-eligible entities have in common and a number of entitlements that the two entitlement-eligible entities do not have in common. In some such embodiments of the system, the processing device is configured to compute the correlation number by multiplying the number of entitlements that the two entitlement-eligible entities have in common by two and then subtracting therefrom the number of entitlements that the two entitlement-eligible entities do not have in common.

In some embodiments of the system, the processing device generates a correlation matrix showing entitlement correlations for each combination of a plurality of entitlement-eligible entities. The processing device can then use the correlation matrix to generate a plurality of different communities of entitlement-eligible entities. In some such embodiments, the processing device is configured to generate a community of entitlement-eligible entities by selecting an entitlement-eligible entity and selecting all entitlement-eligible entities in the selected entitlement-eligible entity's row in the correlation matrix that have a correlation above a defined correlation threshold.

In some embodiments of the system, the processing device is configured to periodically re-determine different communities of entitlement-eligible entities based on a review of the one or more entitlements currently associated with each entitlement-eligible entity at the time of the periodic re-determination.

In some embodiments of the system, the processing device is configured to select a community of entitlement-eligible entities from the plurality of different communities determined by the processing device. The processing device may then be further configured to determine, based on a review of the one or more entitlements currently associated with each entitlement-eligible entity within the selected community, one or more uncommon entitlements whose number in the community is below an uncommon entitlement threshold or one or more normal entitlements whose number in the community is above a normal entitlement threshold.

In some embodiments of the system, the processing device is configured to select a community of entitlement-eligible entities from the plurality of different communities determined by the processing device. The processing device may then be configured to calculate likelihood ratios for each of the one or more entitlements currently associated with the entitlement-eligible entities within the selected community. The processing device can then be further configured to determine, based on the likelihood ratios, one or more uncommon entitlements whose likelihood ratio is below an uncommon entitlement threshold or one or more normal entitlements whose likelihood ratio is above a normal entitlement threshold. In some such embodiments of the system, the processing device may be further configured to mark an uncommon entitlement for a higher priority of review relative to other entitlements not determined to be uncommon entitlements.

Embodiments of the invention further provide a system having: (1) a memory including information stored therein about the distribution of entitlements to a plurality of entities within an organization; and (2) a processor configured to use the information stored in the memory to identify a portion of the plurality of entities based on the distribution of entitlements within the organization, wherein the processor is configured to store information in the memory identifying the portion of the plurality of entities as a community.

In one embodiment of the system, the memory includes information about a pseudo-entity having a combination of entitlements associated therewith. The processor is then configured to identify the portion of the plurality of entities based on a review of the one or more entitlements that each entity of the plurality of entities has in common with the pseudo-entity. In one embodiment, the combination of entitlements associated with the pseudo-entity is based on user input comprising user-selected entitlements. In some embodiments, for each combination of an entity of the plurality of entities and the pseudo-entity, the processor is configured to compute a correlation number representing how well the entitlements associated the entity of the plurality of entities correlate with the combination of entitlements associated with the pseudo-entity. The processor can then identify the portion of the plurality of entities based on the correlation number.

In some embodiments of the system, the information stored in the memory about the distribution of entitlements to the plurality of entities within an organization is updated in real time or near-real time.

In some embodiments of the system, the processor is configured to determine, for each entitlement in the community, an indicator of the amount or likelihood of each entitlement in the community based on a review of the one or more entitlements currently associated with each entity within the community. The processor is configured to then determine one or more uncommon entitlements whose indicator is below an uncommon entitlement threshold or one or more normal entitlements whose indicator is above a normal entitlement threshold. In some such embodiments, the processor is configured to mark an uncommon entitlement for a higher priority of review relative to other entitlements not determined to be uncommon entitlements.

In some embodiments of the system, the memory includes information about entity type for each of the plurality of entities, and the processor is configured to identify rare entity types in the community. In some such embodiments of the system, the processor is further configured to mark a rare entity type for a higher priority of review relative to other entities not determined to be rare in the community.

In some embodiments of the system, the memory includes information about the entity type for each of the plurality of entities. The processor may then be configured to determine, for each entity type represented in the community, an indicator of the amount or likelihood of each entity type in the community based on a review of the one or more entity types currently represented within the community. The processor may then be configured to determine one or more uncommon entity types based on whether each entity type's indicator is below an uncommon entity type threshold.

Embodiments of the invention further provide a method for managing the distribution of entitlements within an organization. In one embodiment, the method involves: (1) providing information regarding a plurality of members in the organization and the entitlements that are currently associated with each member; (2) using a processor to group members from the plurality of members into one or more communities based a review of the one or more entitlements currently associated with each member; and (3) storing in a memory the one or more communities and information about which of the plurality of members are in each of the one or more communities.

In some embodiments, using the processor to group members from the plurality of members into one or more communities involves: computing, using the processor, a correlation number representing how well the entitlements associated with one member correlates with the entitlements associated with another member; and determining, using the processor, a community based at least partially on the correlation number. In some such embodiments, the processor is configured to compute the correlation number as a function of a number of entitlements that the two members have in common and a number of entitlements that the two members do not have in common.

In some embodiments of the method, the method further involves: creating a pseudo-member having a combination of entitlements associated therewith; and grouping, using the processor, a portion of the plurality of members into a community based on a review of the one or more entitlements that each member of the plurality of members has in common with the pseudo-member. In some such embodiments, the method further involves using user input to select the combination of entitlements associated with the pseudo-member.

In some embodiments of the method, for each combination of a member of the plurality of members and the pseudo-member, the processor is configured to compute a correlation number representing how well the entitlements associated the member of the plurality of members correlate with the combination of entitlements associated with the pseudo-member. In some such embodiments, the method further involves grouping a portion of the plurality of members into a community based on a the correlation number.

In some embodiments of the method, the method further involves: (1) providing information about the member type for each of the plurality of members; (2) determining an indicator of an amount or likelihood of each member type in a community based on a review of the one or more member types currently represented within the community; (3) determining one or more uncommon member types based on whether each member type's indicator is below an uncommon member type threshold; and (4) marking a member in the community that is associated with the one or more uncommon member types.

In some embodiments of the method, the method also involves: (1) selecting a community from the one or more communities; (2) analyzing the entitlements that are currently associated with the members of the selected community to determine, for each entitlement in the selected community, the number of members in the selected community that are currently associated with each entitlement; (3) determining whether the number of members in the selected community that are currently associated with each entitlement is below a certain threshold; (4) identifying the members in the selected community associated with entitlements below the threshold; and (5) determining whether the identified members should be associated with the entitlements below the threshold.

In some embodiments of the method, the method also involves: (1) selecting a community from the one or more communities; (2) analyzing the entitlements that are currently associated with the members of the selected community to determine, for each entitlement in the selected community, the number of members in the selected community that are currently associated with each entitlement; (2) determining whether the number of members in the selected community that are currently associated with each entitlement is above a certain threshold; (3) identifying the members in the selected community not associated with entitlements above the threshold; and (4) determining whether the identified members should be associated with the entitlements above the threshold.

In some embodiments of the method, the method further includes automatically distributing entitlements in the community that are above the threshold to the members in the selected community that are not associated with the entitlements above the threshold.

BRIEF DESCRIPTION OF THE DRAWINGS

Figure 1:
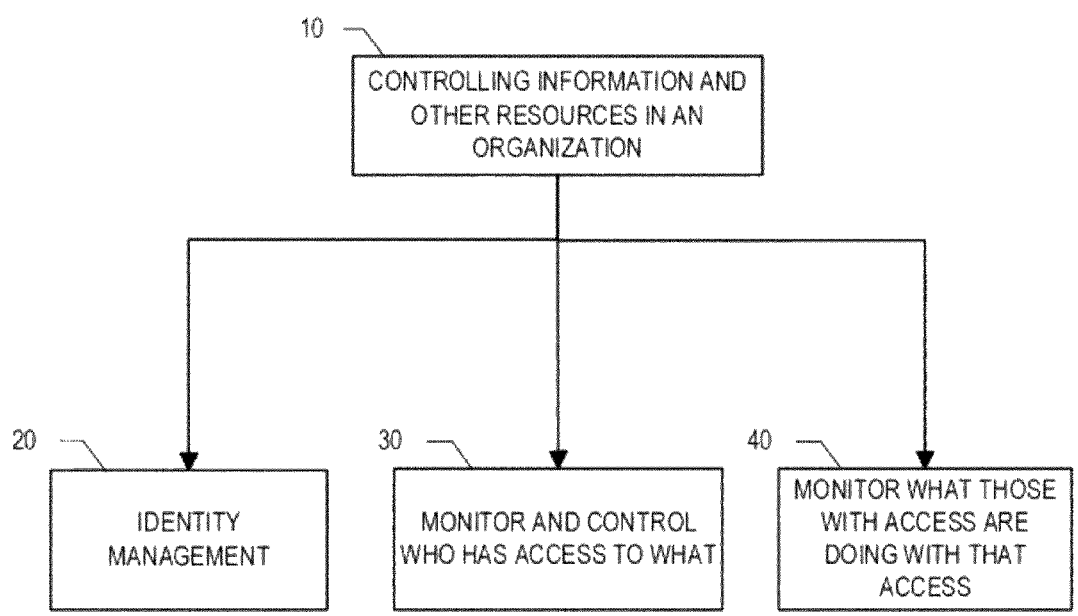
Figure 2:
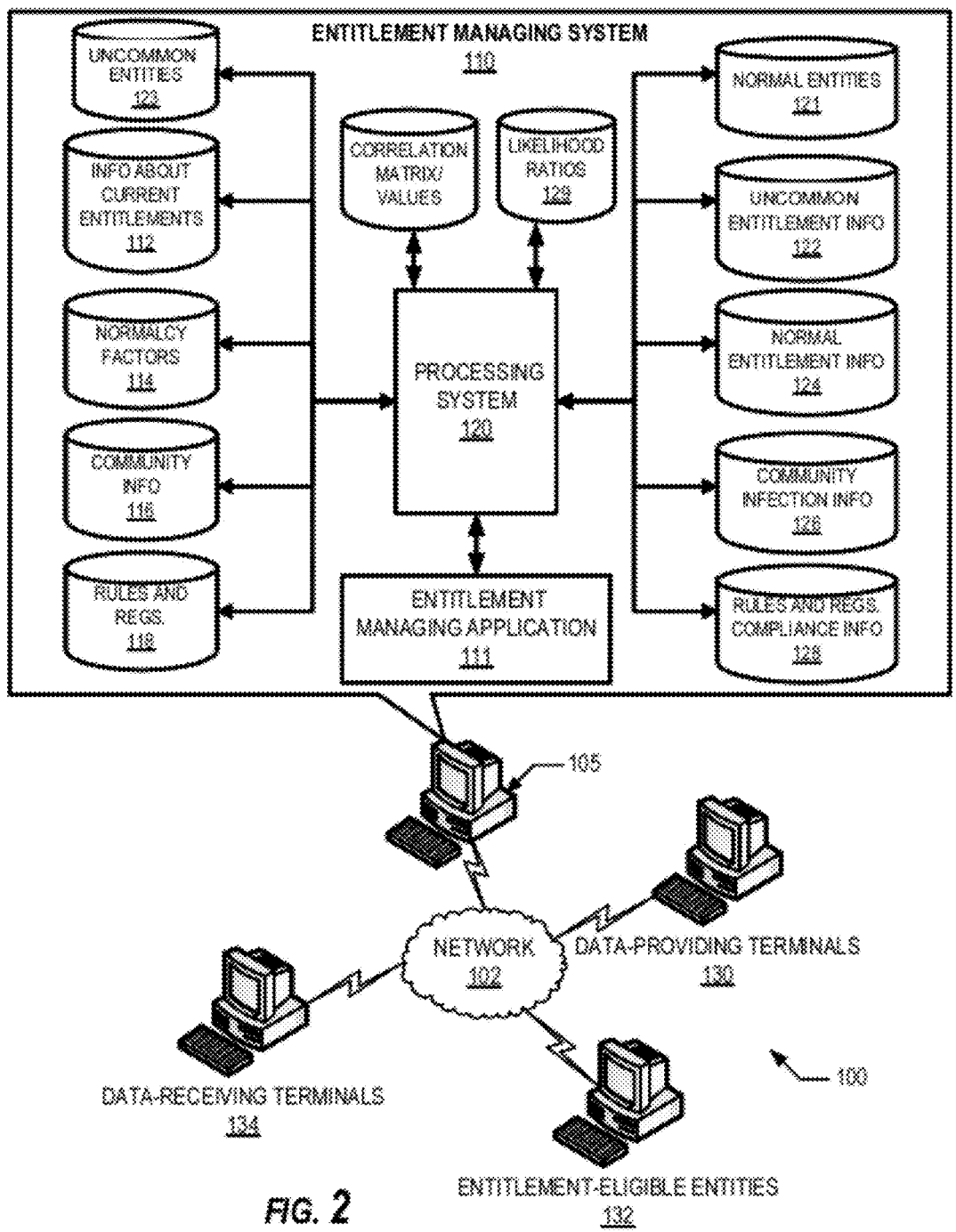
Figure 3:
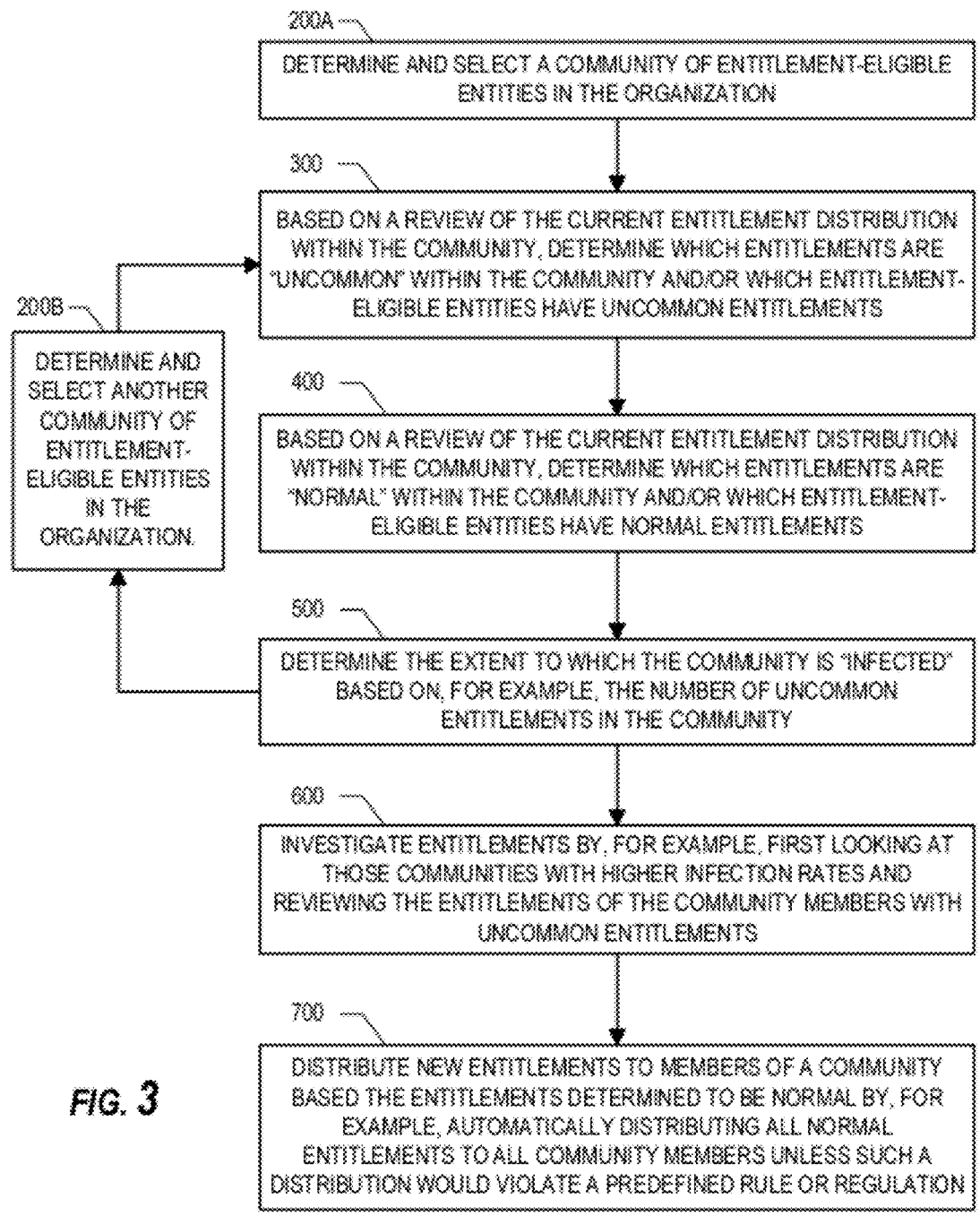
Figure 4:
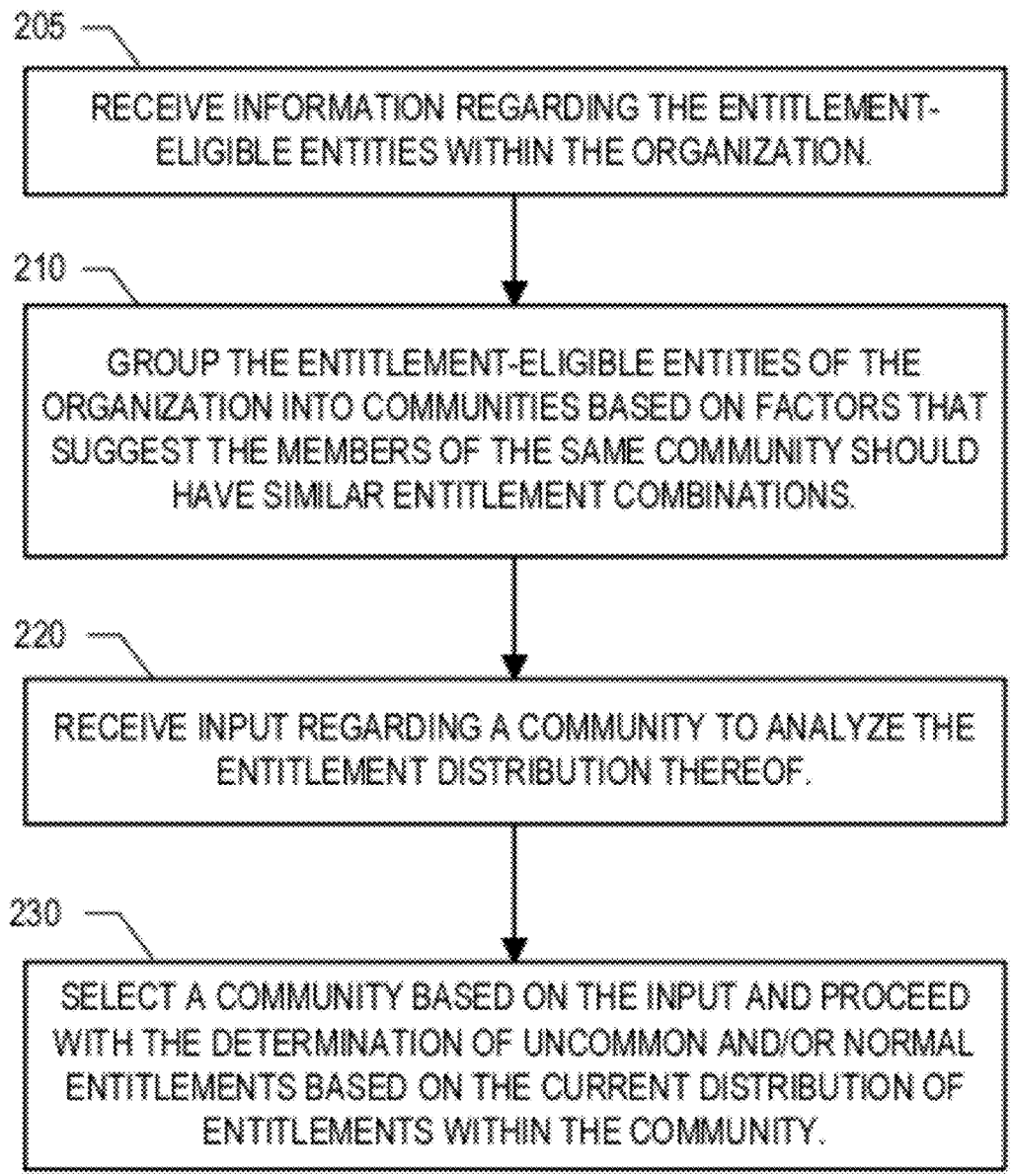
Figure 5:
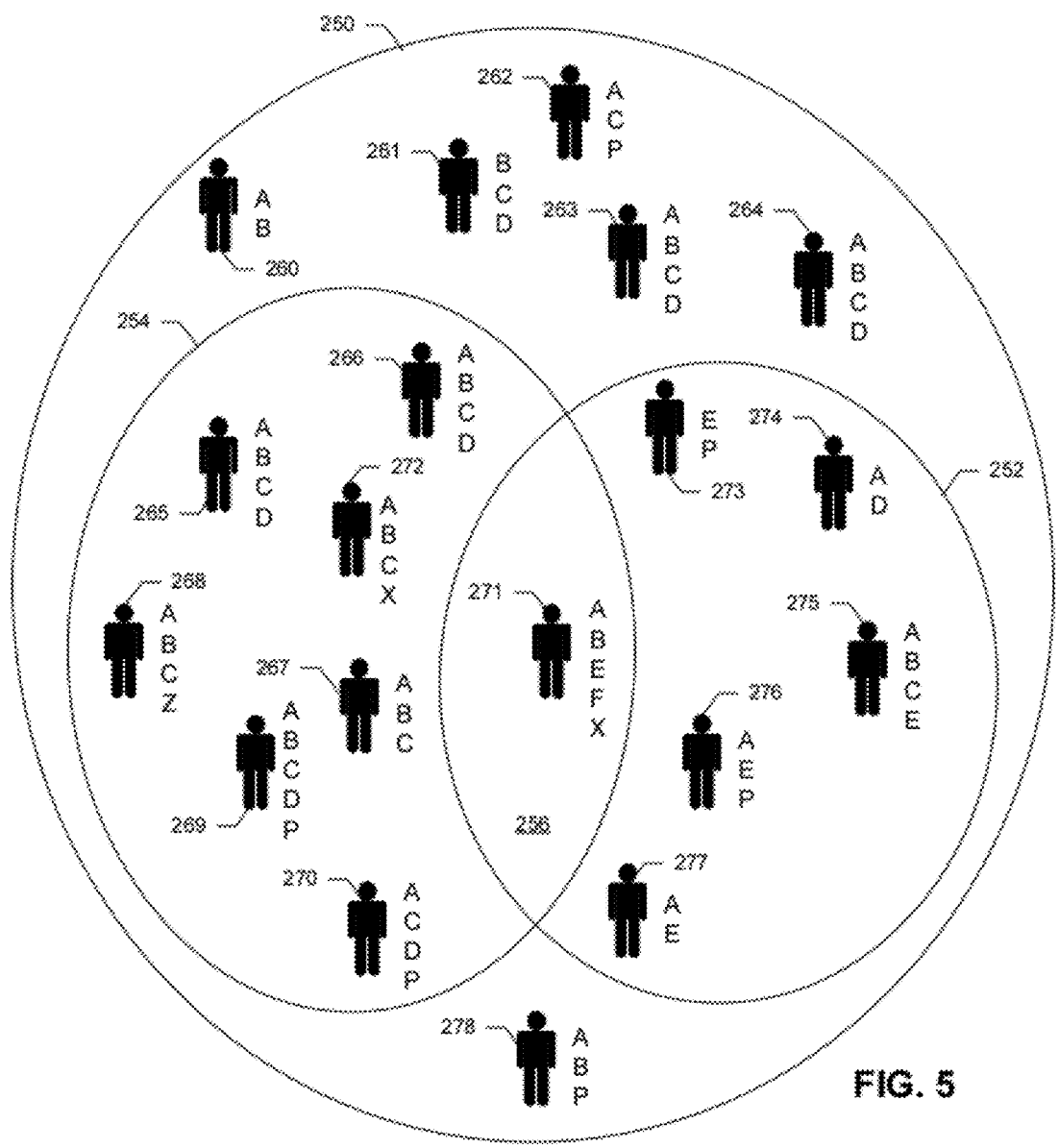
Figure 6:
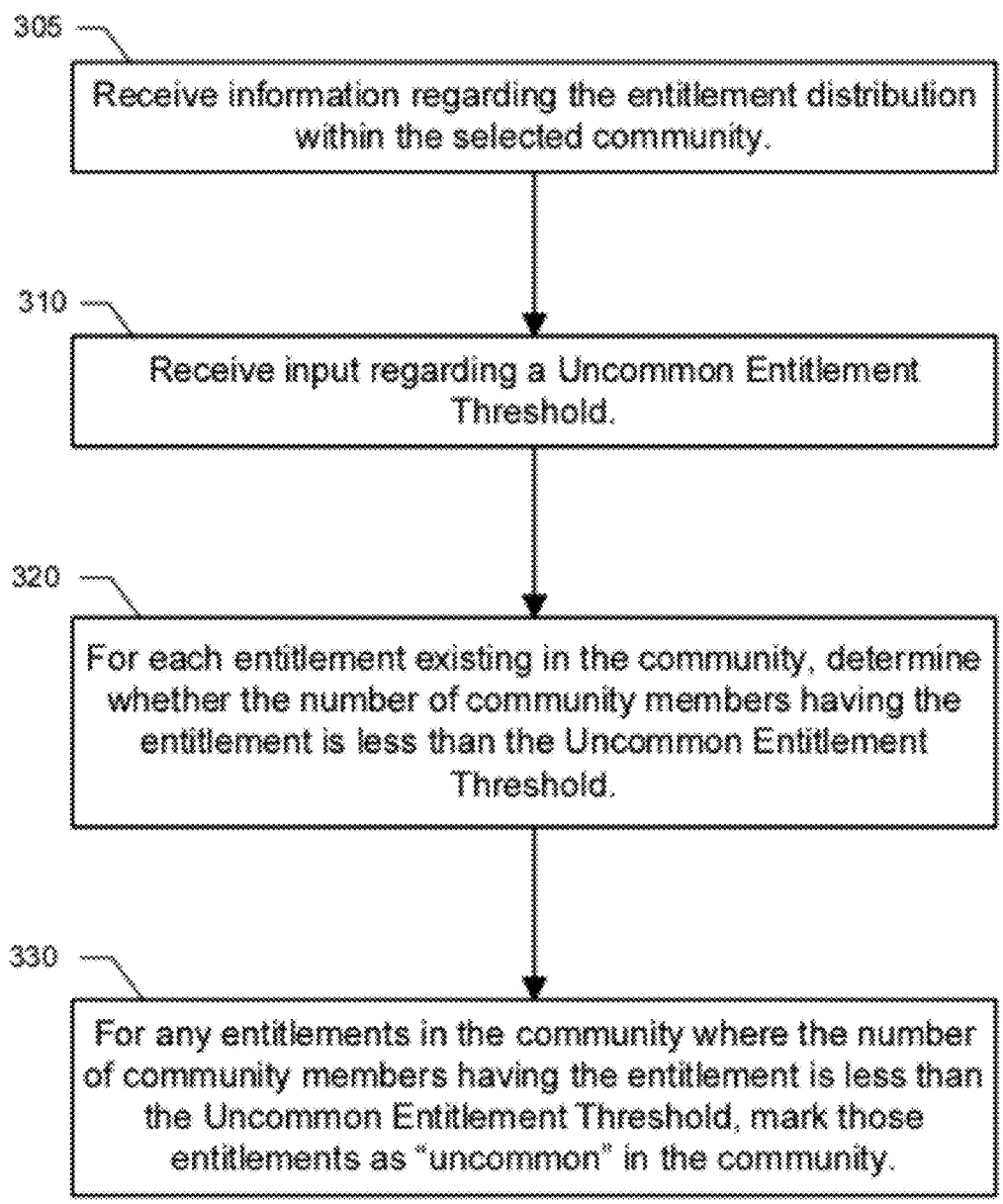
Figure 7:
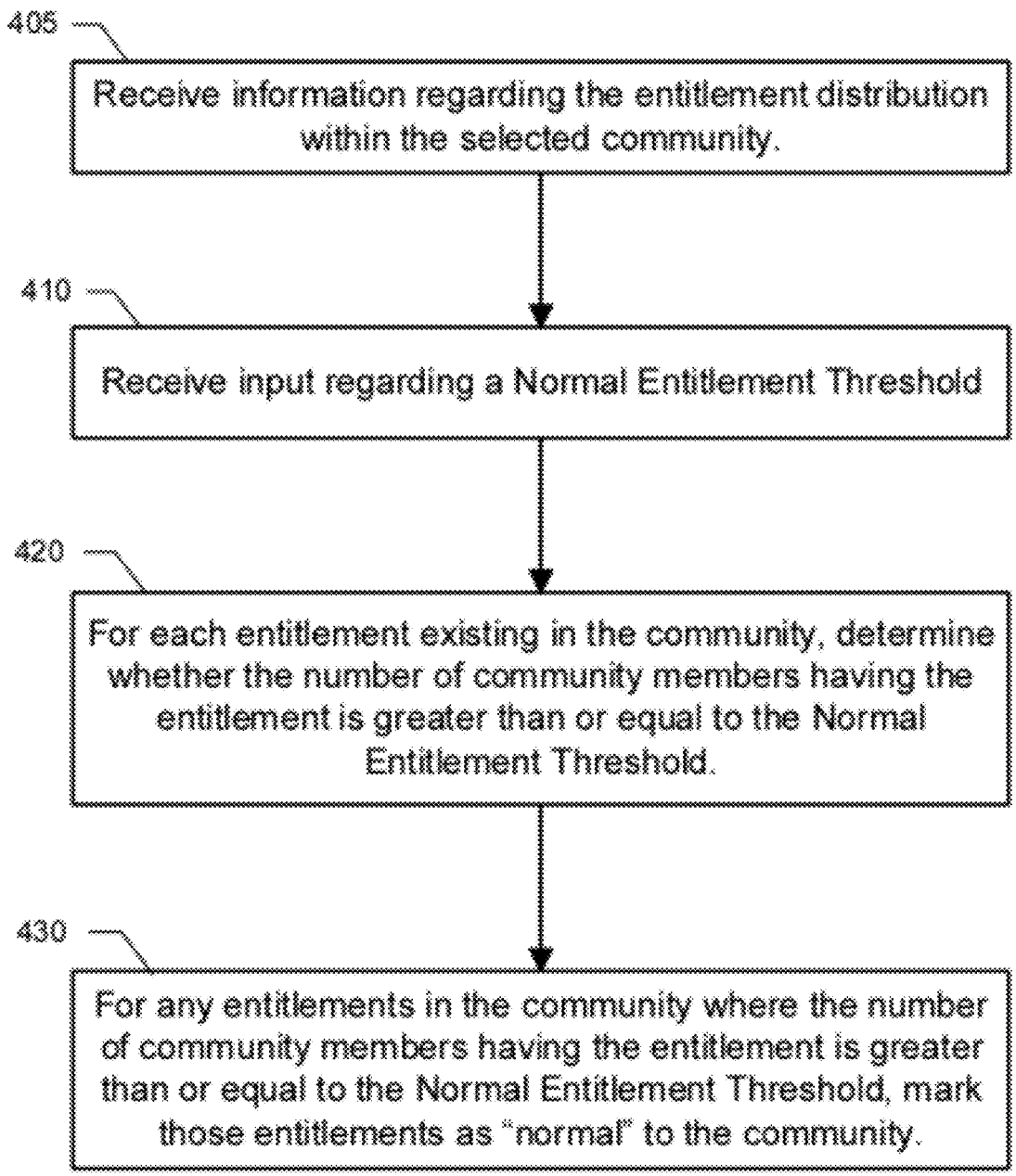
Figure 8:
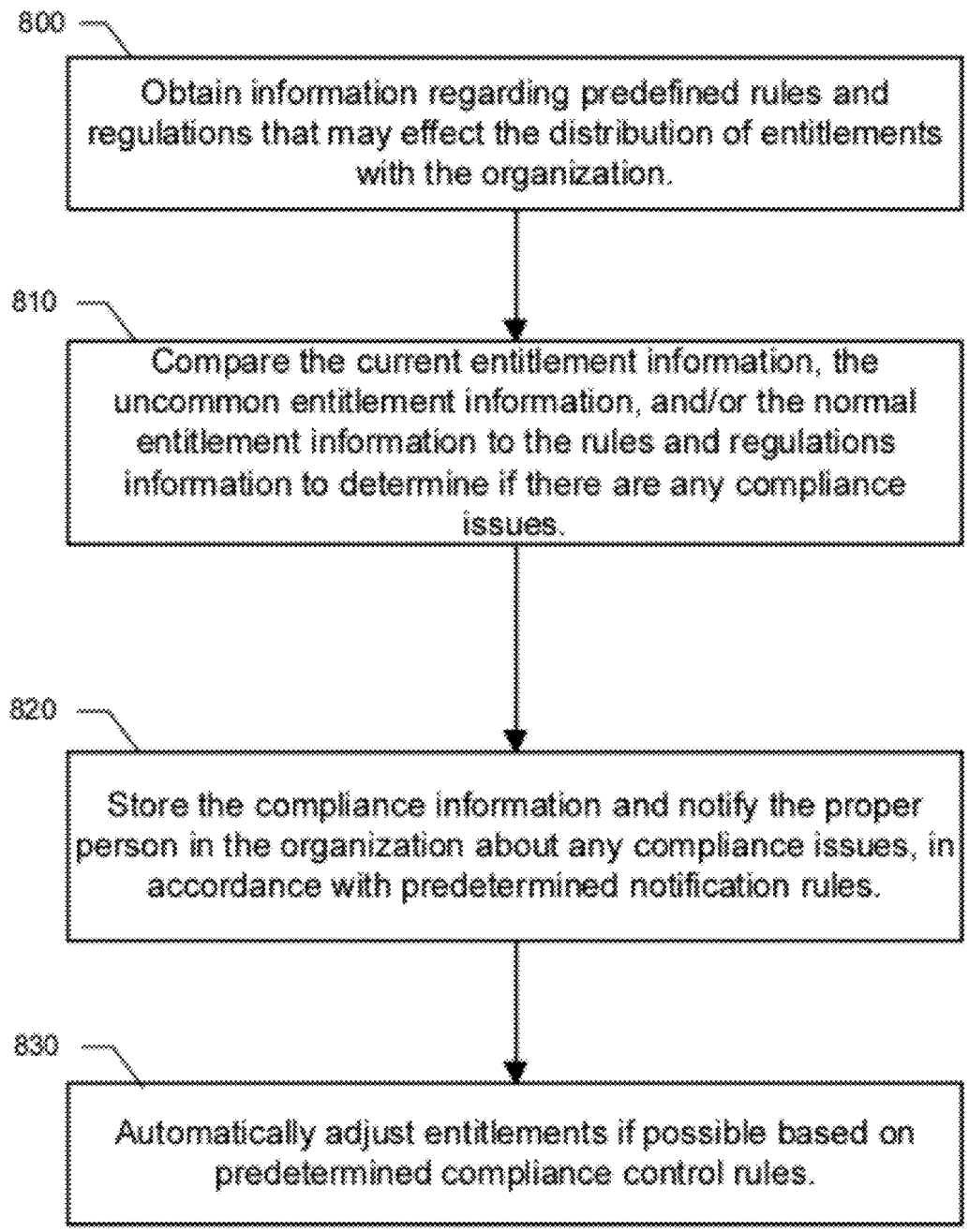
Figure 11:
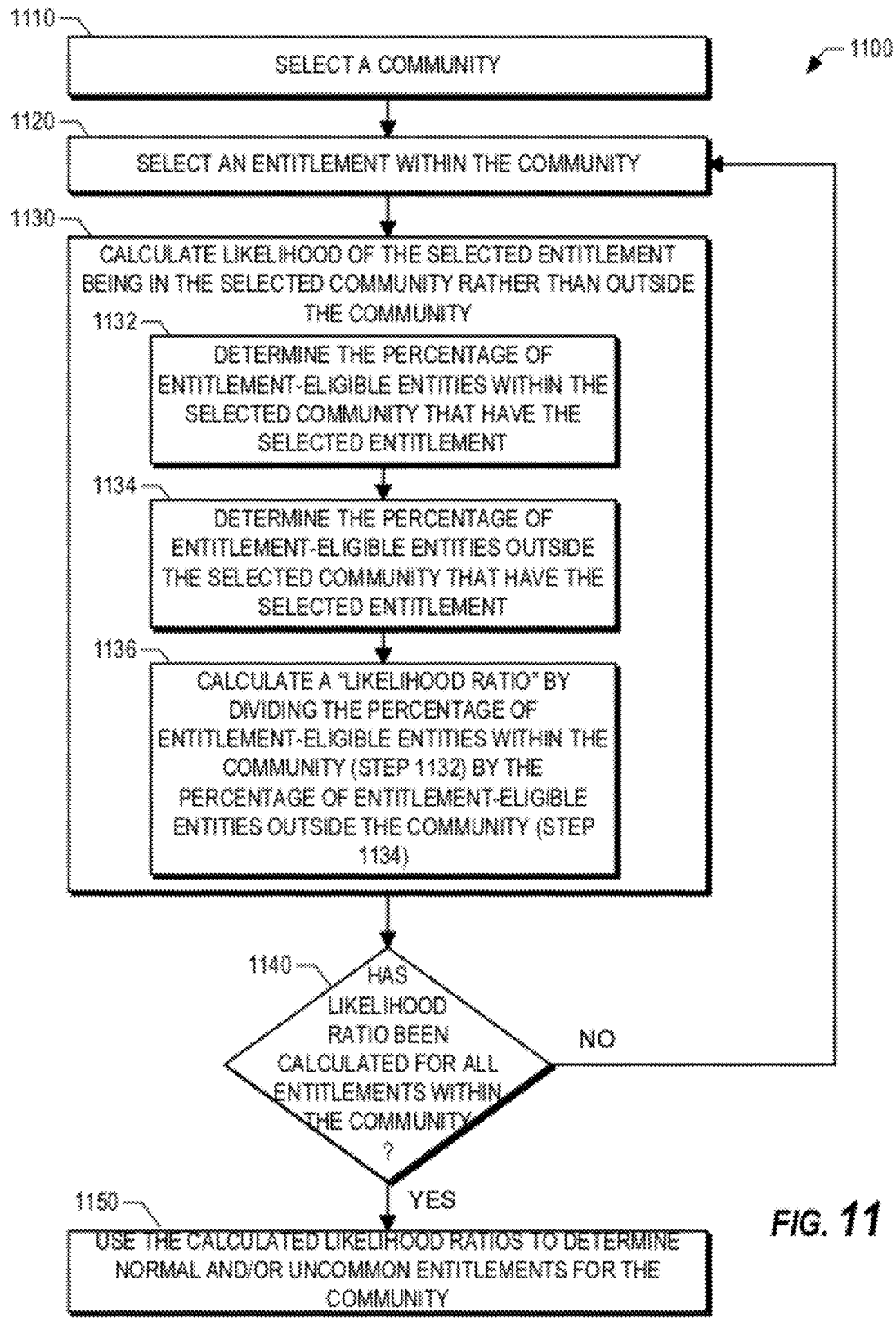
Figure 12:
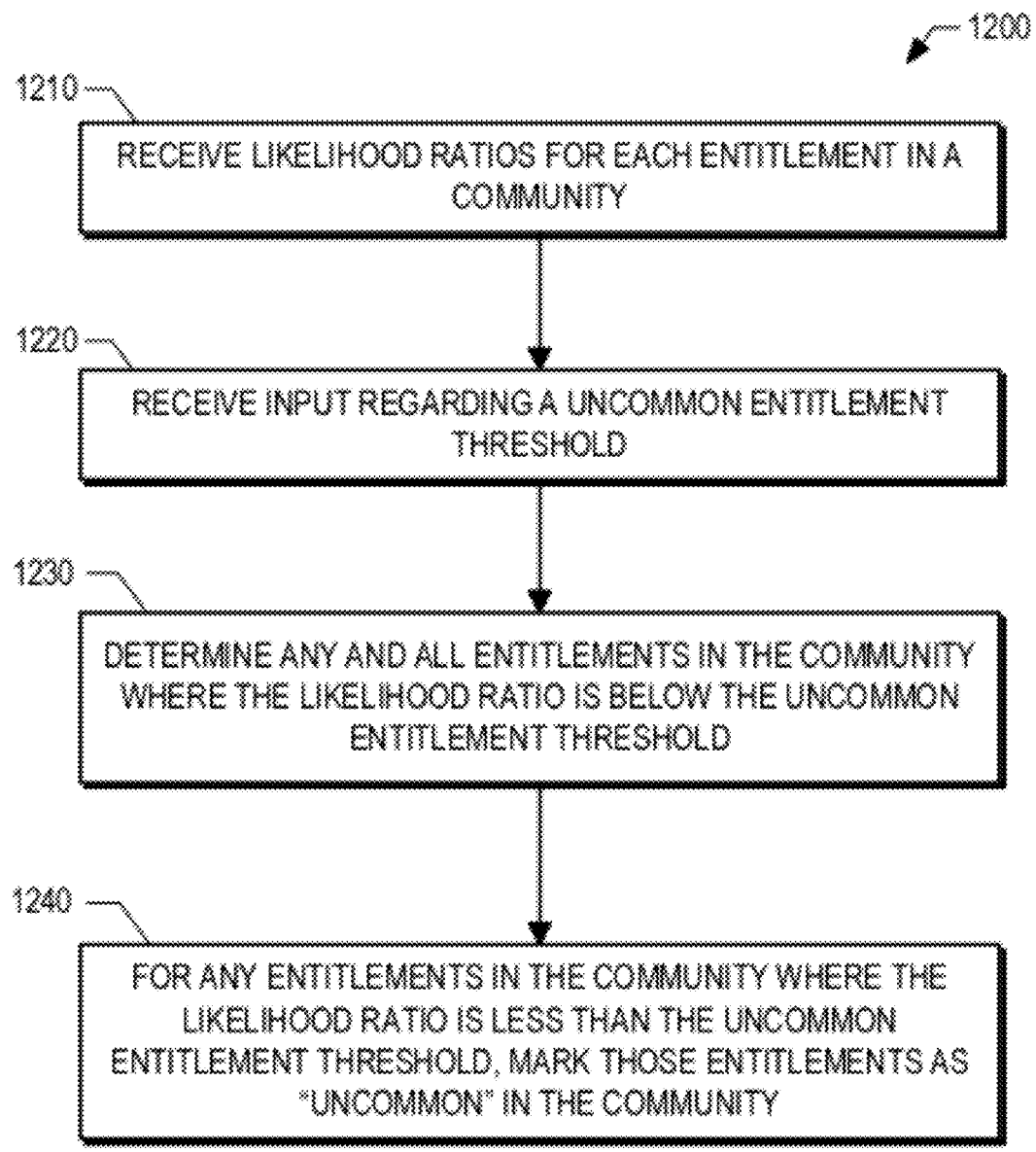
Figure 13:
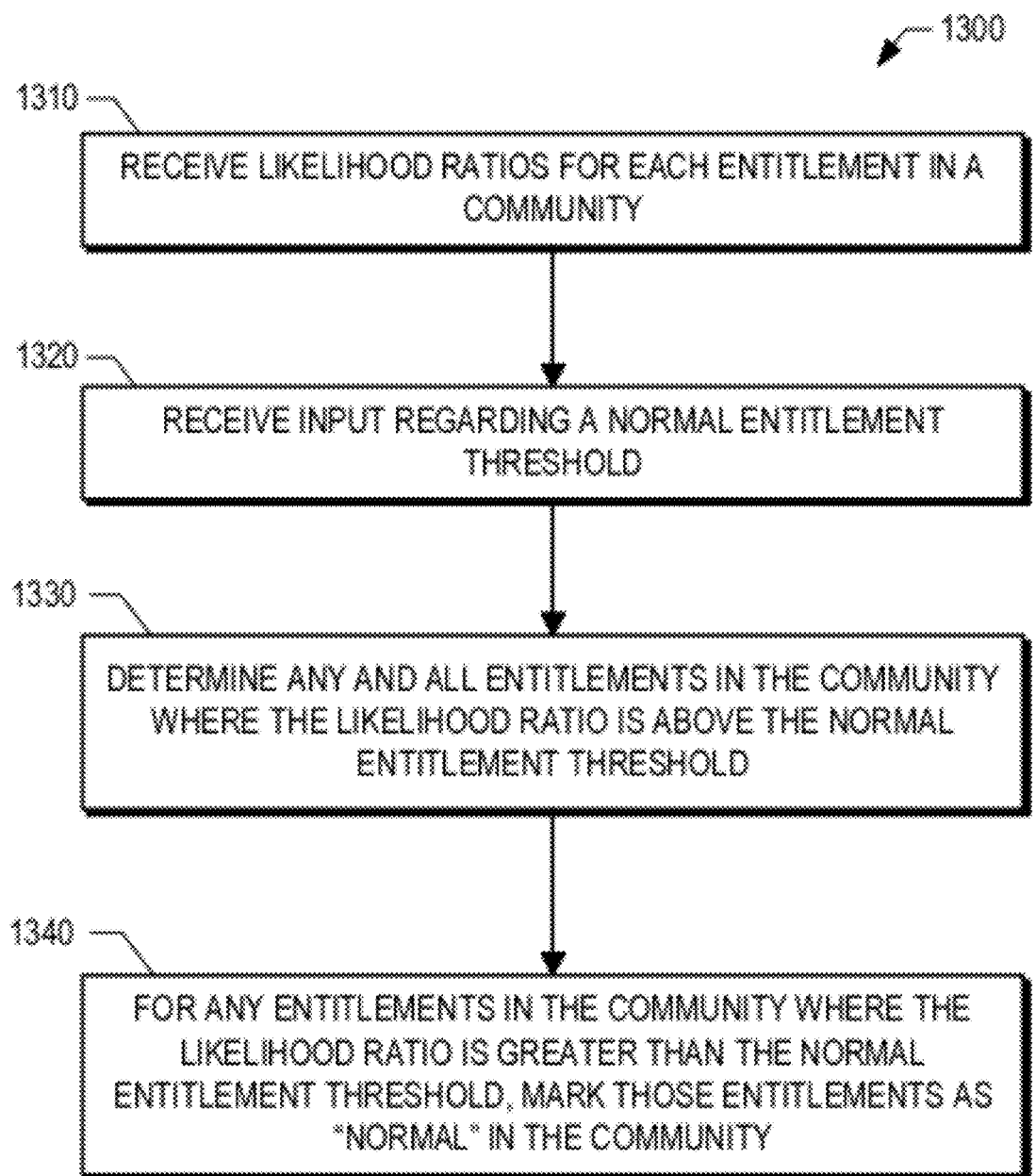
Figure 15:
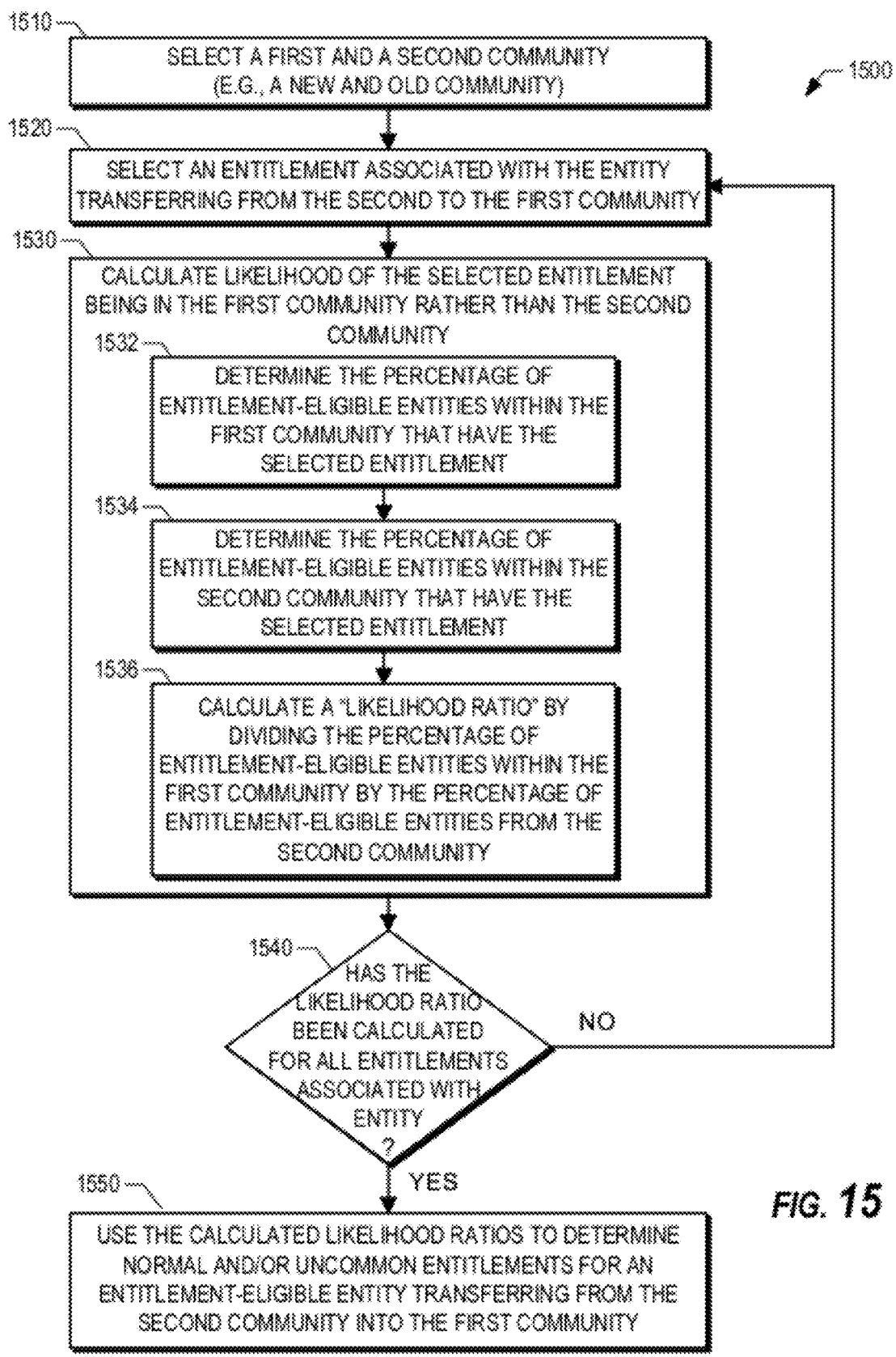
Figure 16:
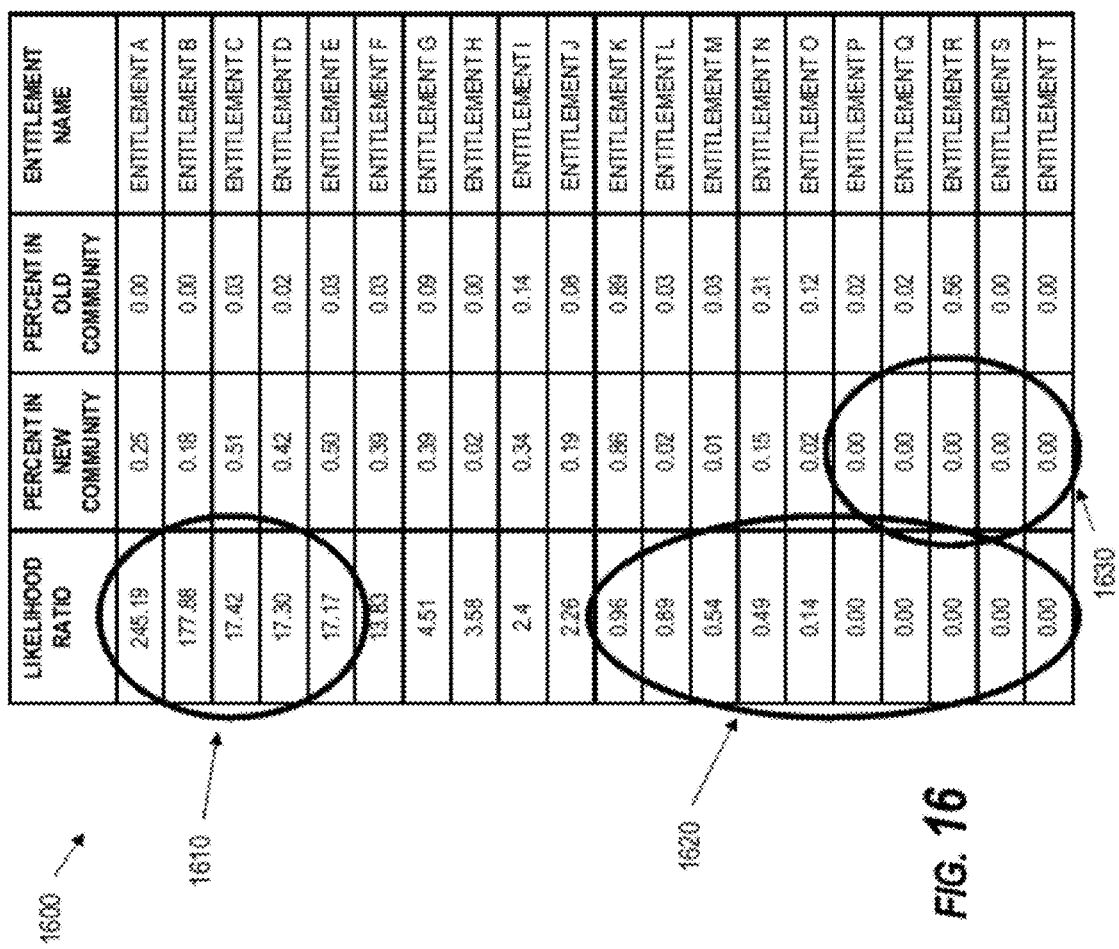
Figure 17:
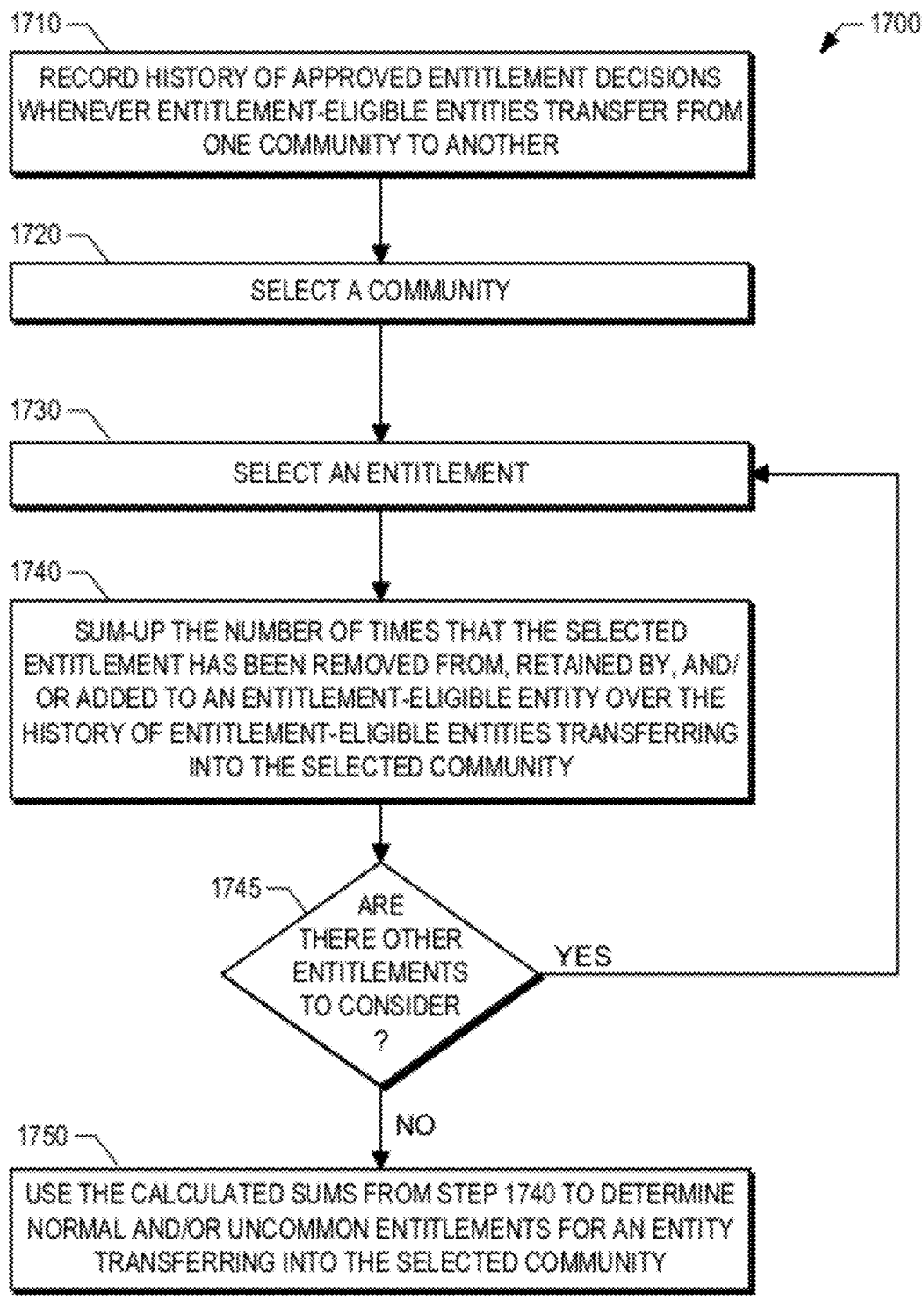
Figure 18:
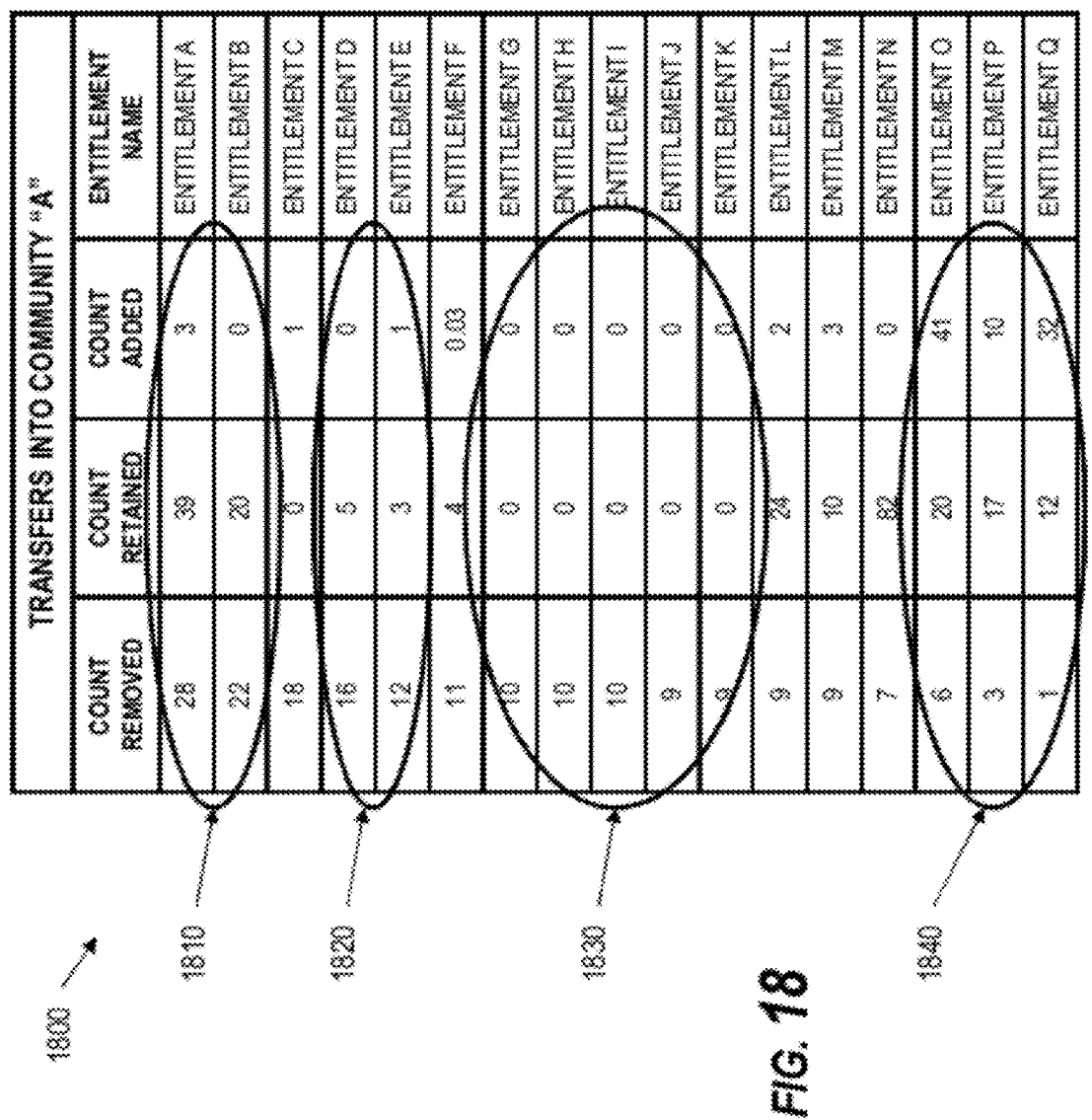
Figure 19:
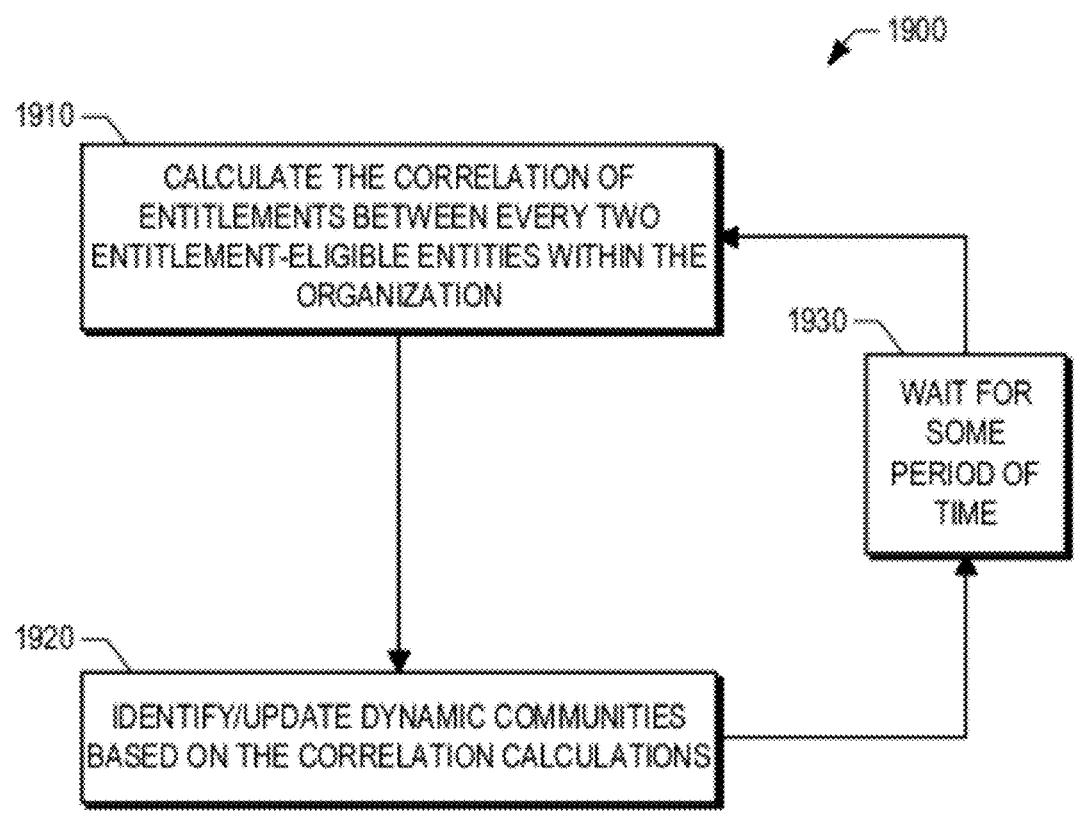
Figure 20:
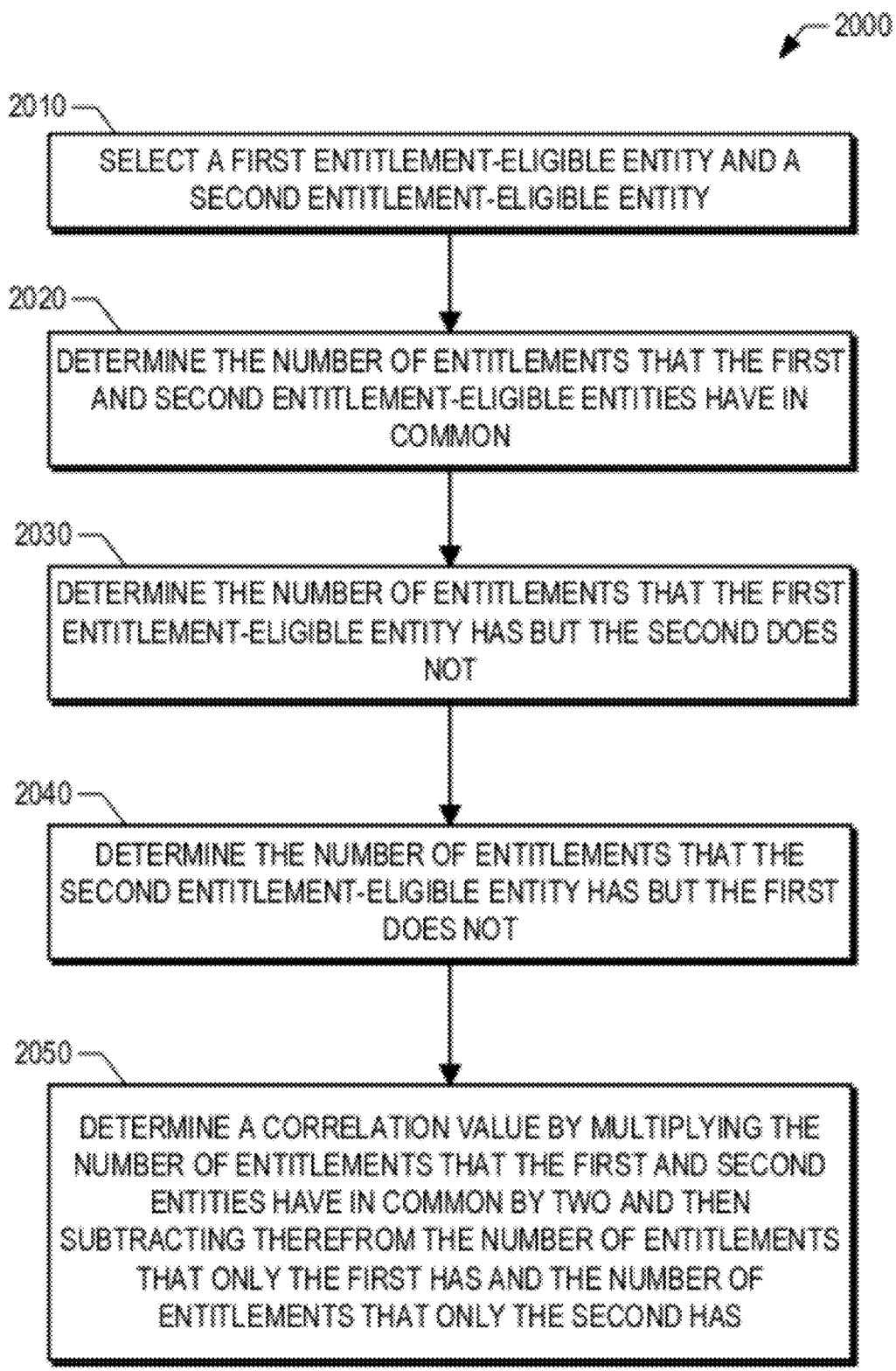
Figure 21:
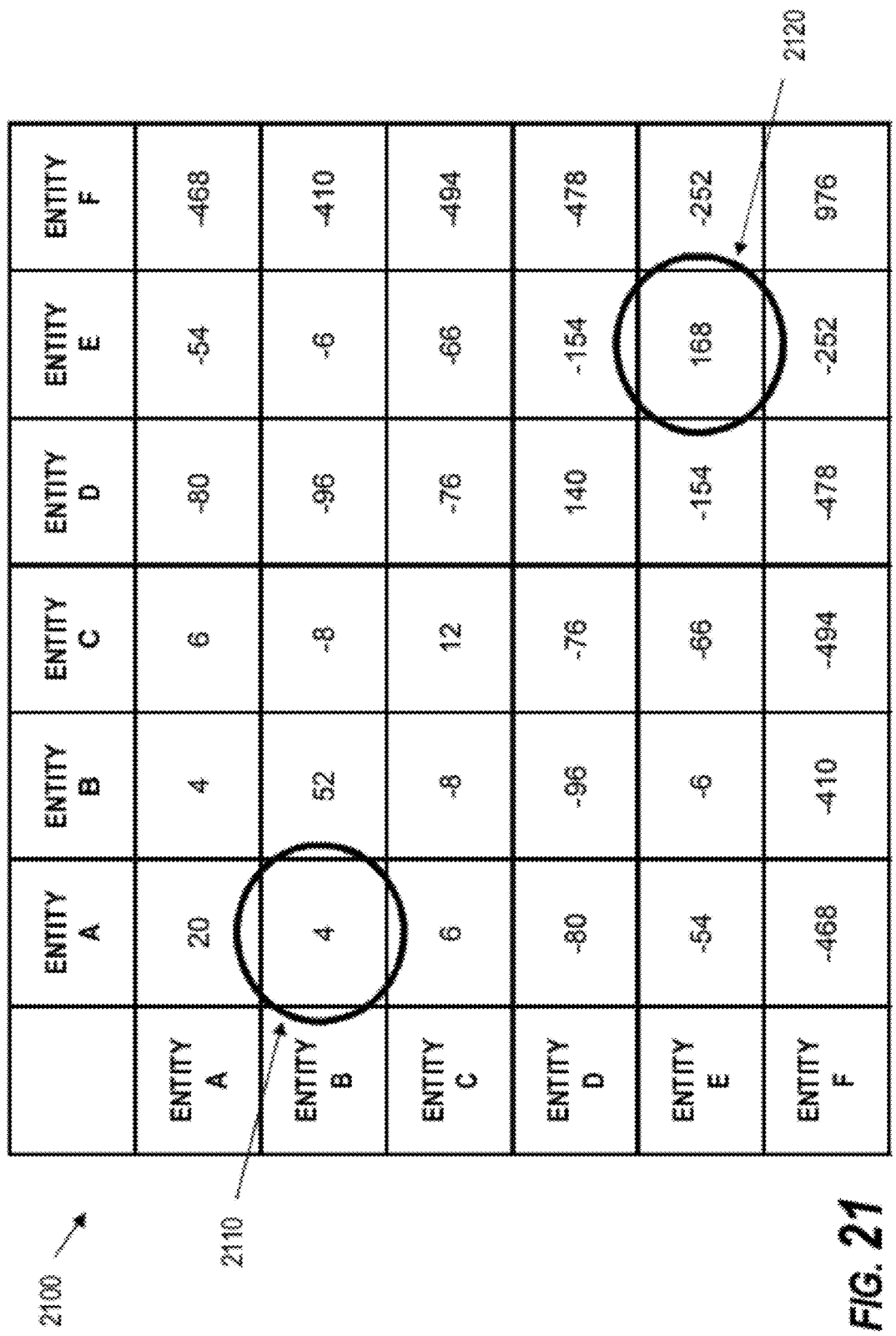
Figure 22:
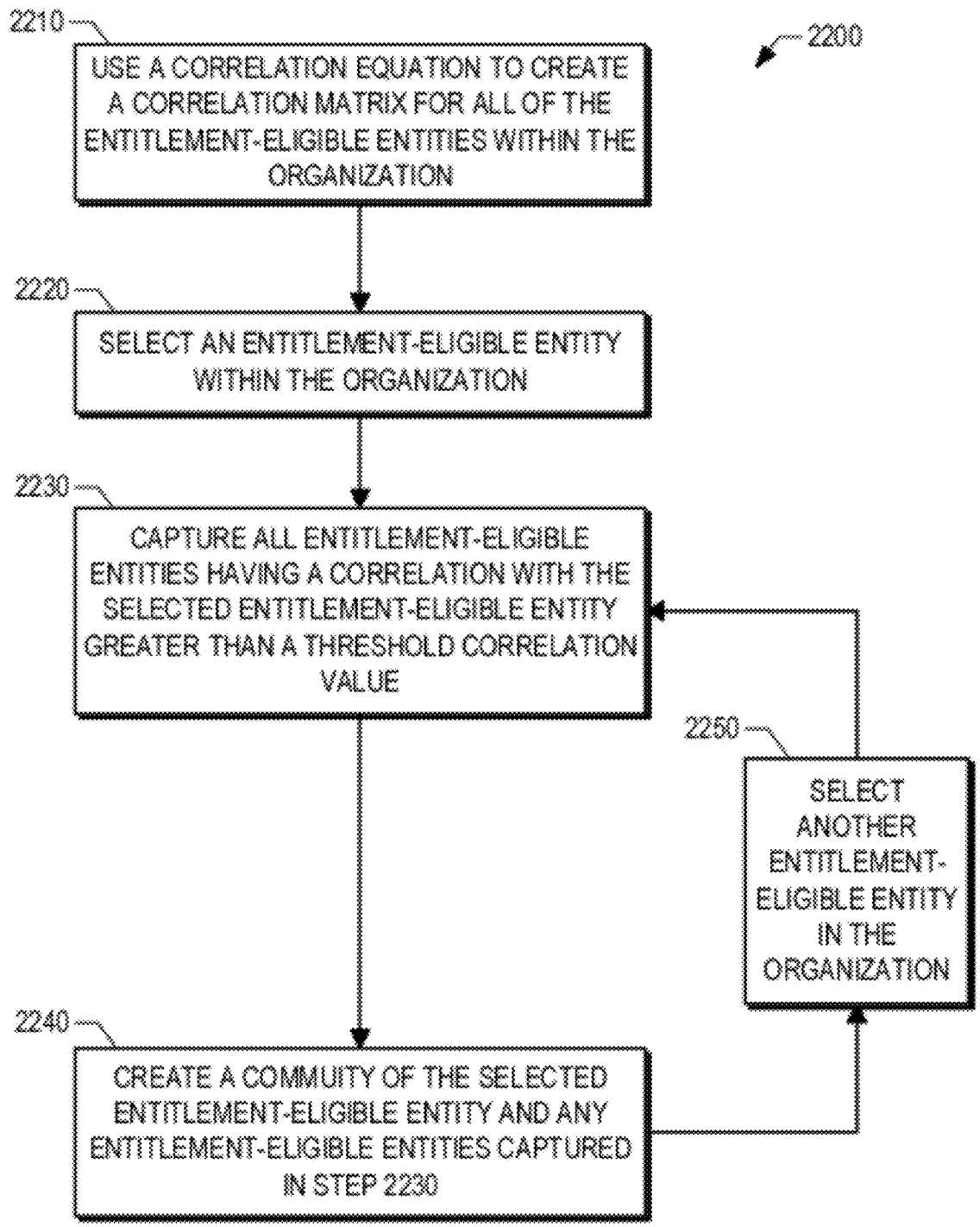
Figure 23:
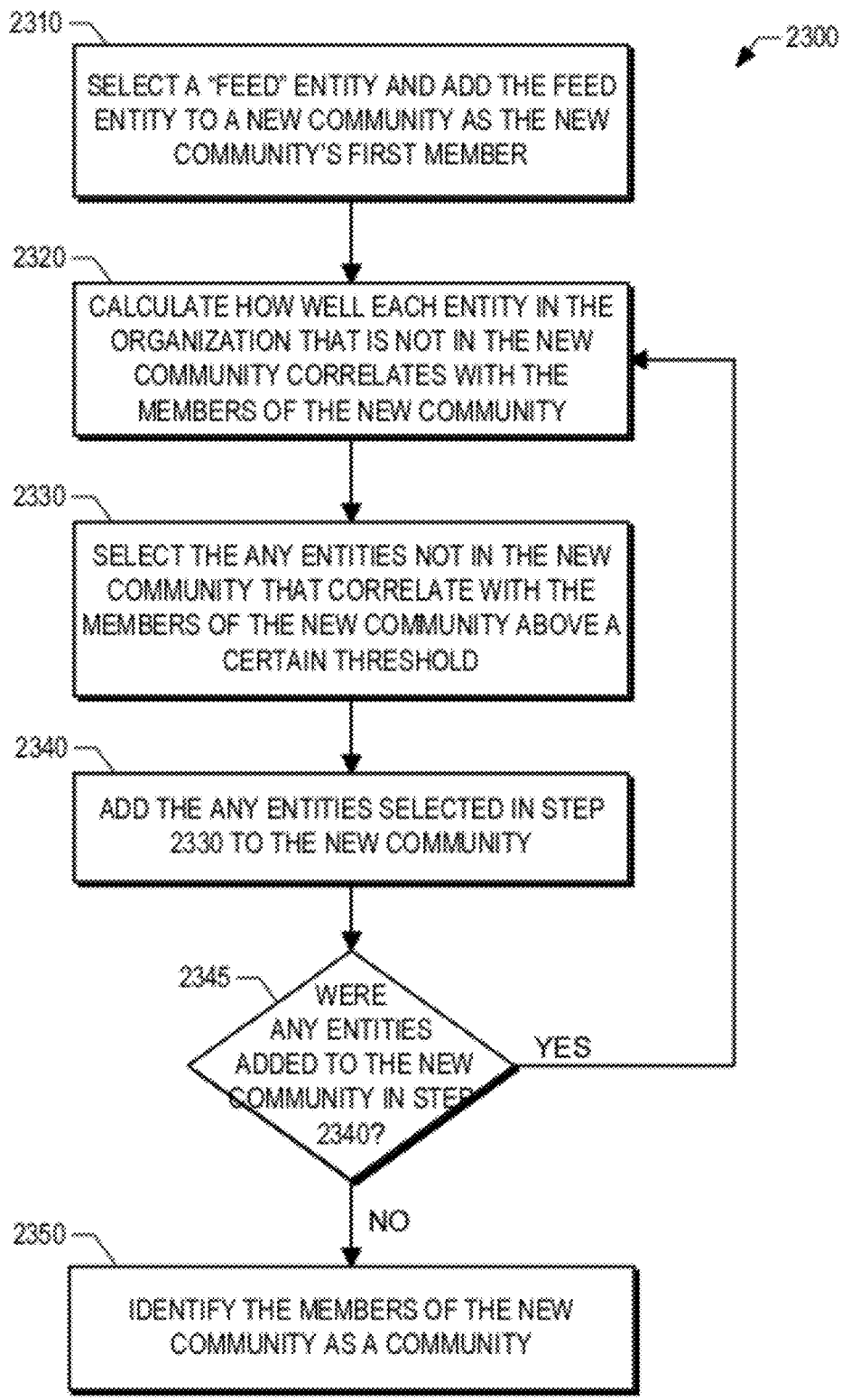
Figure 24:
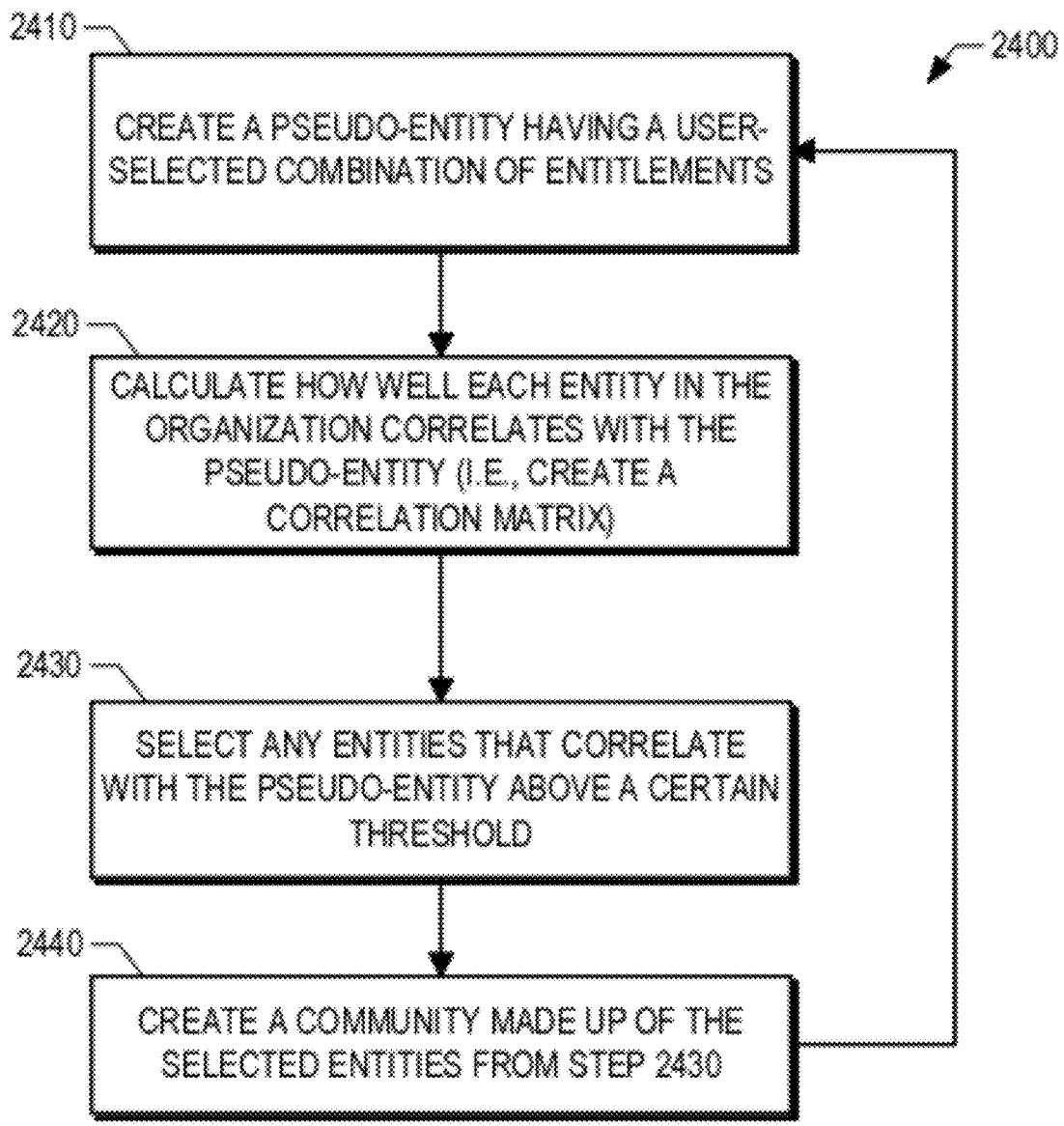
Figure 25:
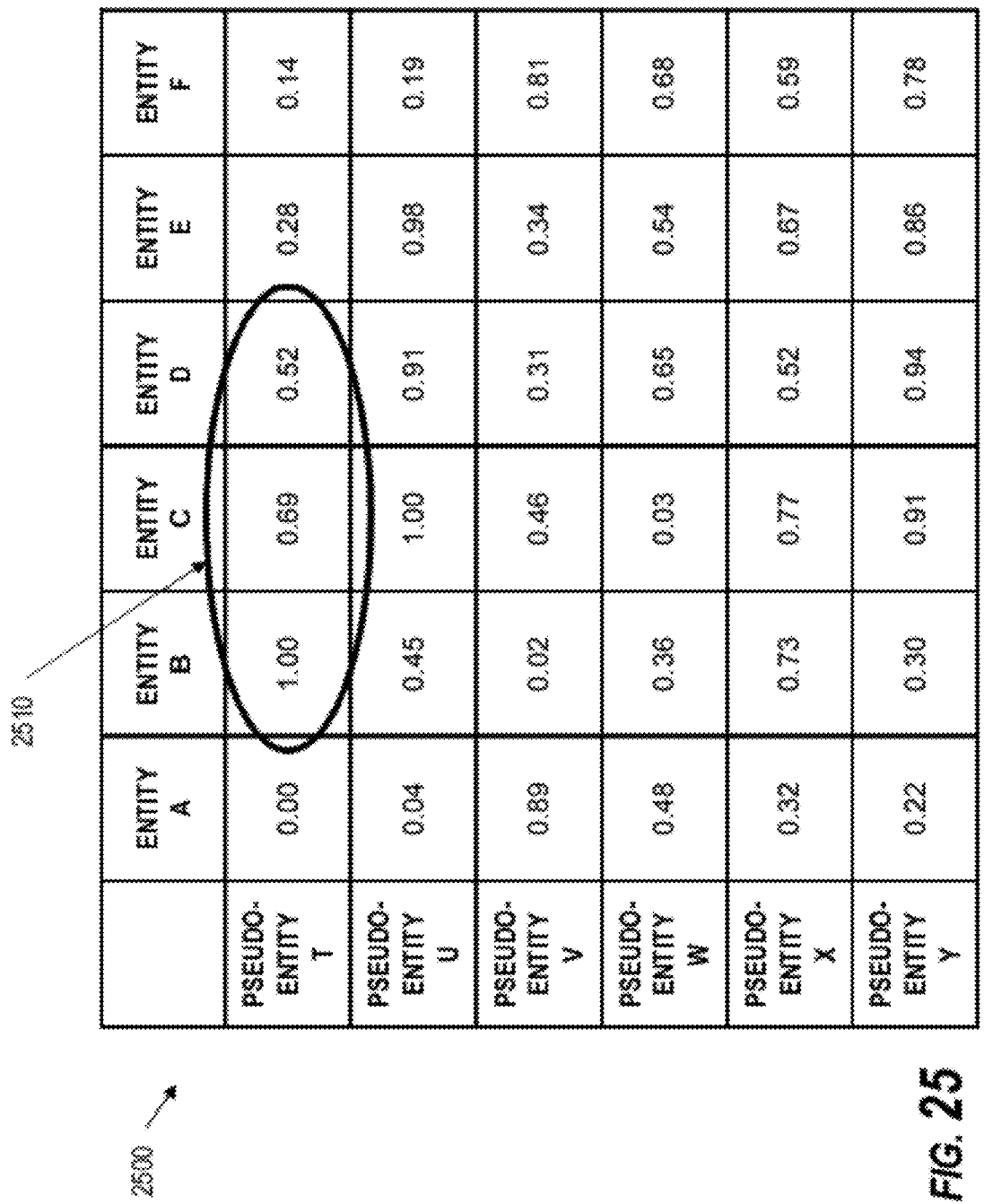
Figure 26:
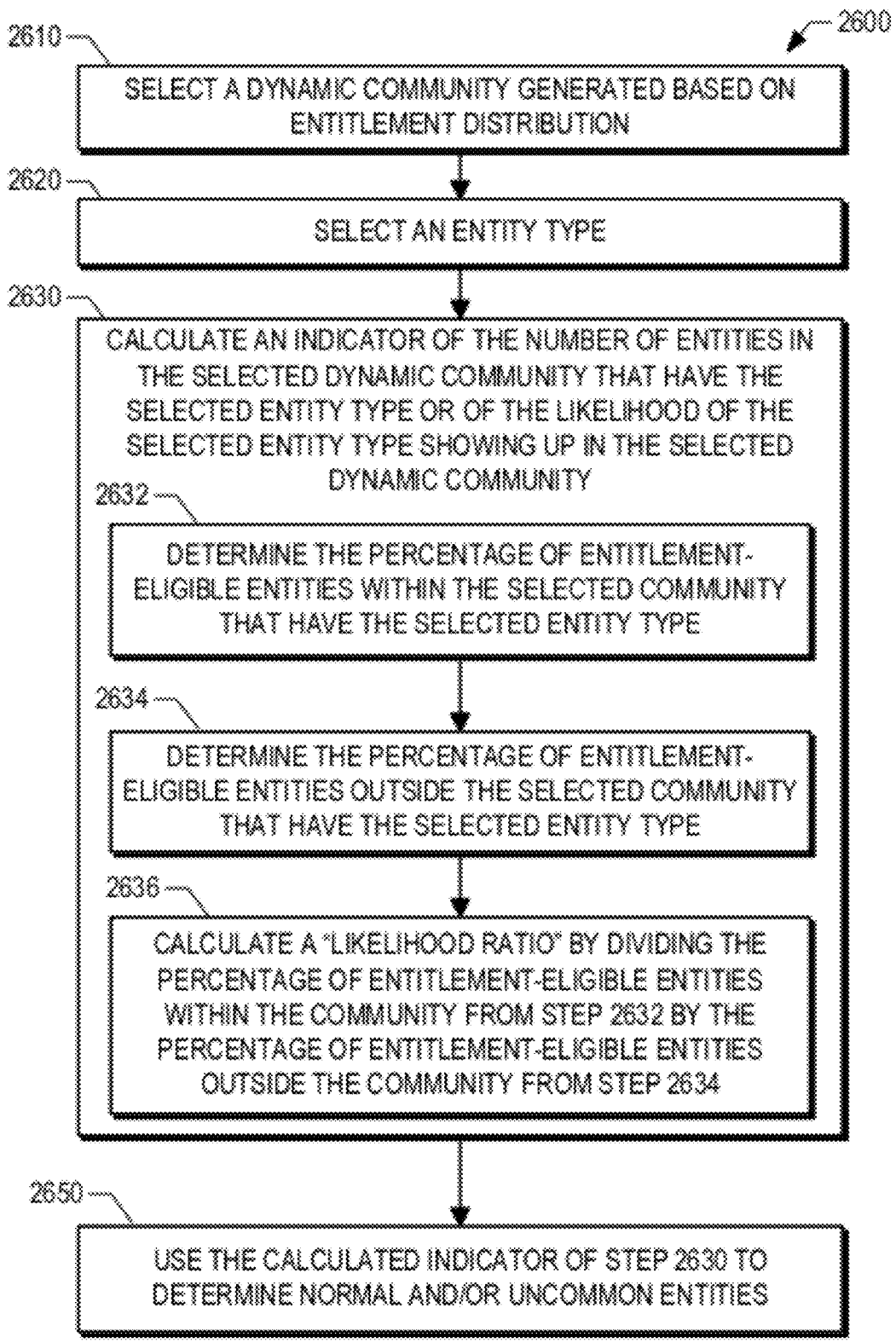
Figure 27:
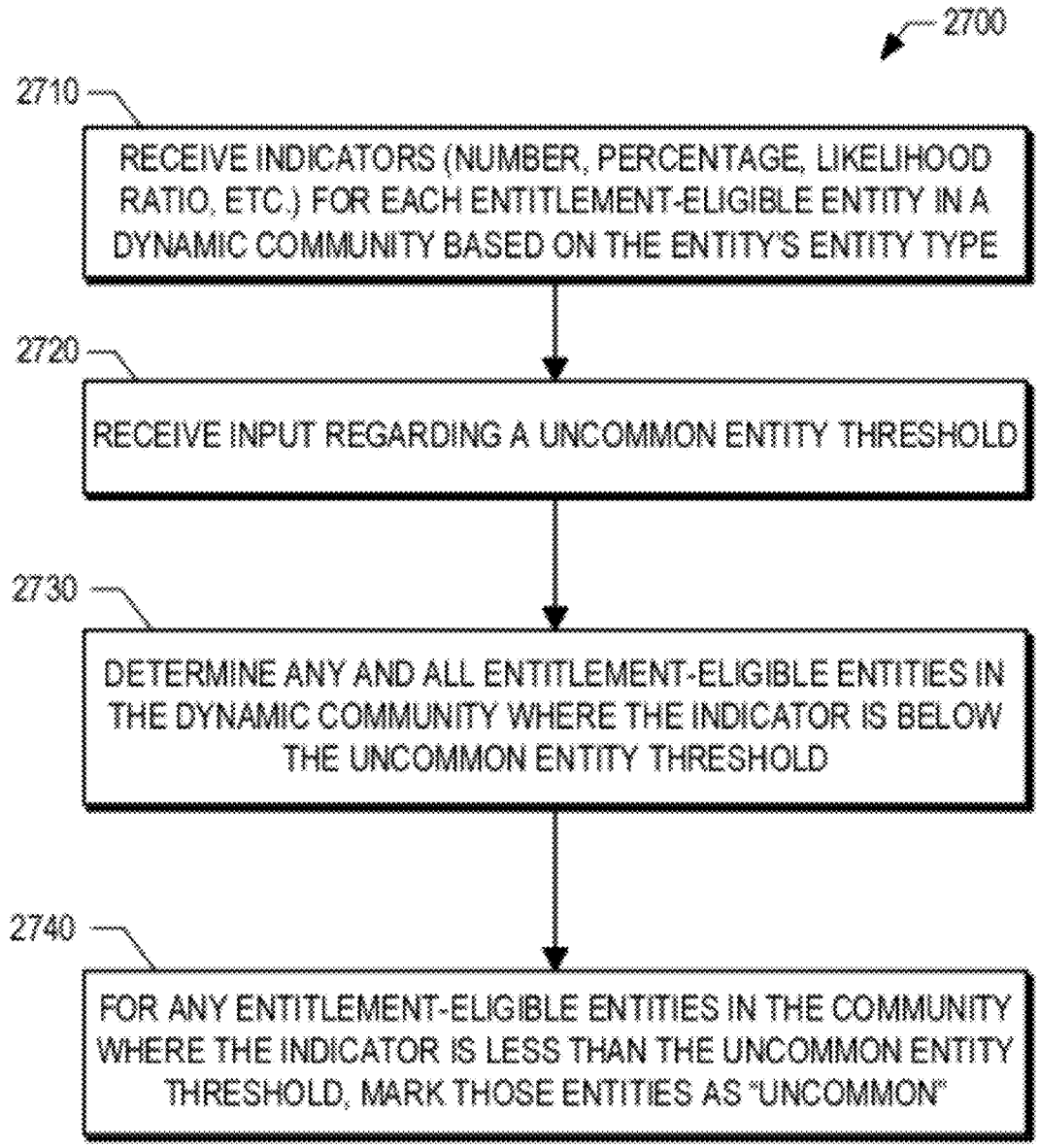
Figure 28:
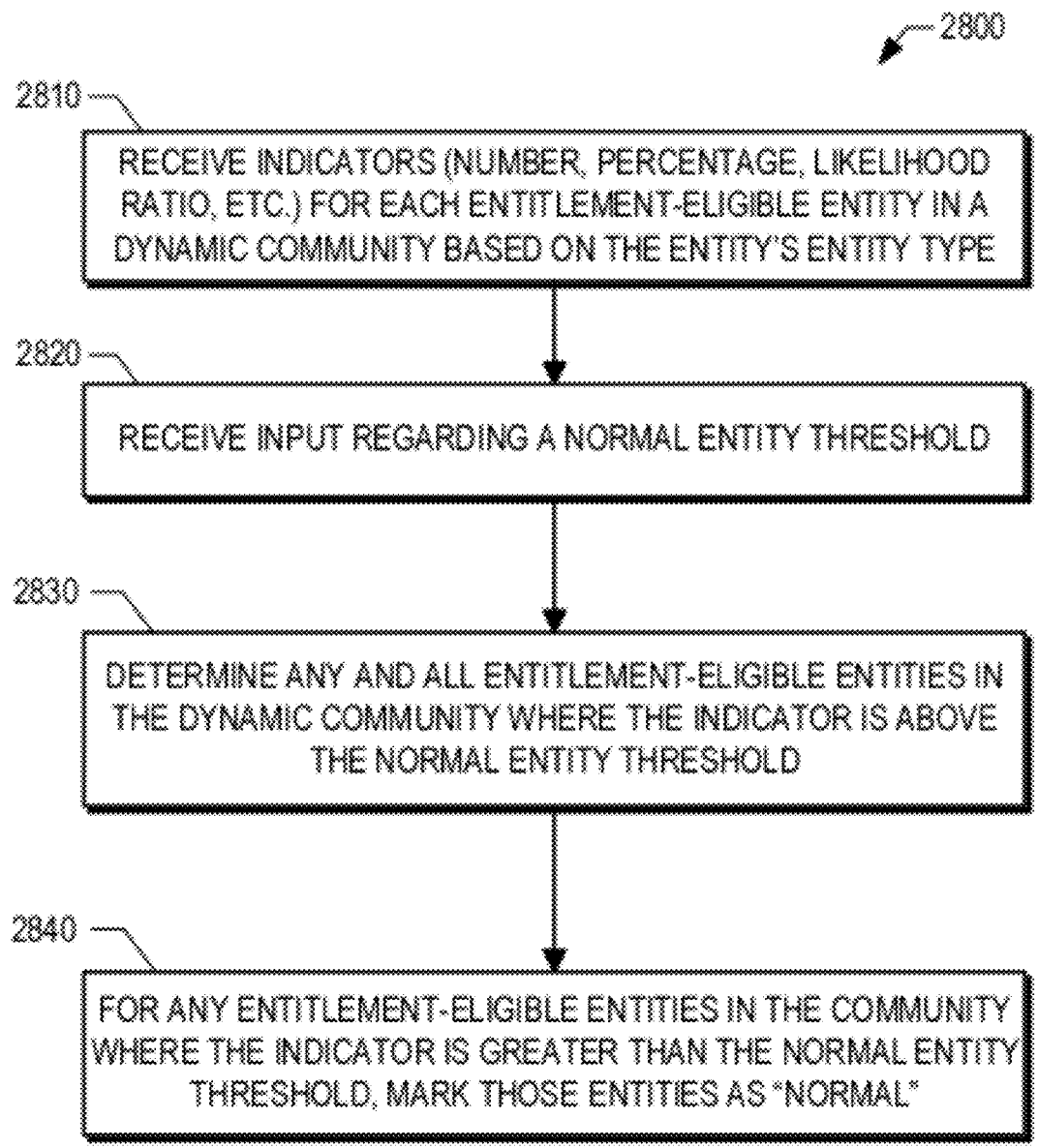

Having thus described embodiments of the invention in general terms, reference will now be made to the accompanying drawings, which are not necessarily drawn to scale, and wherein:

FIG. 1 is a block diagram illustrating a system for controlling the dissemination of information and other resources held and/or maintained by an organization, in accordance with an embodiment of the invention;

FIG. 2 illustrates an entitlement managing system in accordance with an embodiment of the invention, as well as an environment in which the processes described herein are implemented in accordance with an embodiment of the invention;

FIG. 3 is a flow diagram illustrating a procedure for more efficiently monitoring and controlling the distribution of entitlements within an organization, in accordance with an embodiment of the invention;

FIG. 4 is a flow diagram illustrating a procedure for determining and selecting a community of entitlement-eligible entities in an organization, in accordance with an embodiment of the invention;

FIG. 5 is a simplified illustration of an organization of entitlement-eligible entities grouped into several overlapping communities and each having a combination of one or more entitlements, in accordance with an exemplary embodiment of the invention;

FIG. 6 is a flow diagram illustrating a procedure for determining "uncommon" entitlements currently existing within a community, in accordance with an embodiment of the invention;

FIG. 7 is a flow diagram illustrating a procedure for determining "normal" entitlements within a community, in accordance with an embodiment of the invention;

FIG. 8 is a flow diagram illustrating a procedure for automatically determining whether any entitlements or combinations of entitlements in an organization create any compliance issues for the organization, in accordance with an embodiment of the invention;

FIG. 9 illustrates an exemplary graphical user interface for allowing a user to input information into a computer program product in order to more efficiently analyze the entitlements within an organization, in accordance with an embodiment of the invention;

Figures 10A, 10B:
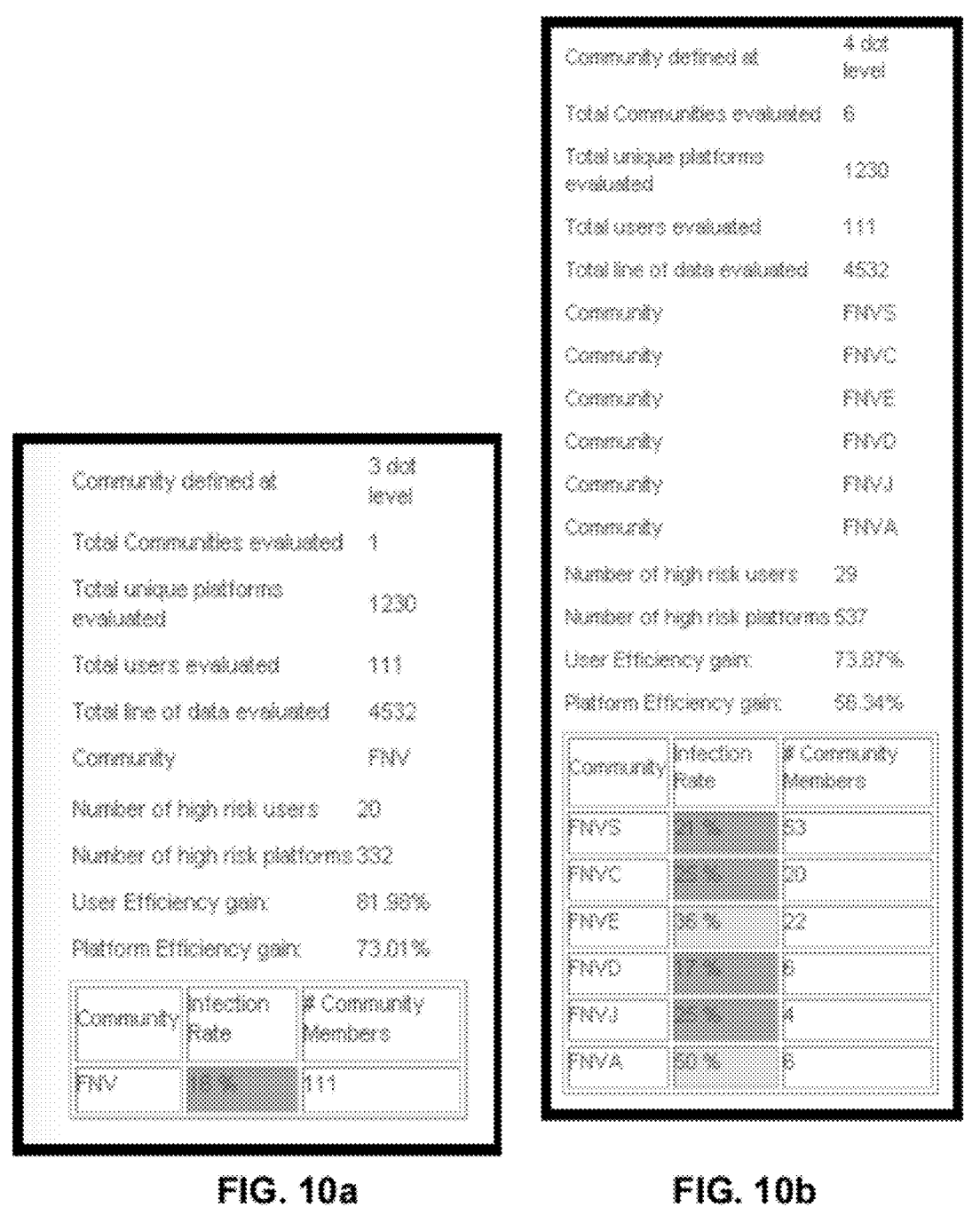

FIGS. 10A, 10B, and 10C illustrate graphical user interfaces providing exemplary user output showing the results of the entitlement analysis performed in accordance with an embodiment of the present invention;

FIG. 11 illustrates a process for calculating "likelihood ratios" to determine "normal" and/or "uncommon" entitlements within a community, in accordance with one embodiment of the invention;

FIG. 12 illustrates a process for using likelihood ratios to determine which entitlements are "uncommon" in a community, in accordance with an embodiment of the invention;

FIG. 13 illustrates a process for using likelihood ratios to determine which entitlements are "normal" in a community, in accordance with an embodiment of the invention;

FIG. 14 illustrates a table and possible graphical user interface output showing the likelihood ratios and other entitlement information generated for a particular community, in accordance with an embodiment of the invention;

FIG. 15 illustrates a process for calculating "likelihood ratios" to determine "normal" and/or "uncommon" entitlements for an entitlement-eligible entity that has transferred or is going to transfer from one community to another, in accordance with one embodiment of the invention;

FIG. 16 illustrates a table and possible graphical user interface output showing the likelihood ratios and other entitlement information generated for a particular entitlement-eligible entity that has transferred or is transferring from one community to another, in accordance with an embodiment of the invention;

FIG. 17 illustrates another process of determining "normal" and/or "uncommon" entitlements for an entitlement-eligible entity transferring into a particular community, in accordance with an embodiment of the invention;

FIG. 18 illustrates a table and possible graphical user interface output showing entitlement information generated from the process described in FIG. 17, in accordance with an embodiment of the invention;

FIG. 19 illustrates a process for generating dynamic communities in accordance with an embodiment of the invention;

FIG. 20 illustrates a process of calculating a value representing the correlation of entitlements between two entitlement-eligible entities, in accordance with an embodiment of the invention;

FIG. 21 illustrates an example correlation matrix in accordance with an embodiment of the invention;

FIG. 22 illustrates a process of generating dynamic communities based on the correlation matrix, in accordance with an embodiment of the invention;

FIG. 23 illustrates another process of generating dynamic communities, in accordance with another embodiment of the invention;

FIG. 24 illustrates a process for generating dynamic communities based on entitlement distribution and using one or more pseudo-entities, in accordance with an embodiment of the invention;

FIG. 25 illustrates an example correlation matrix when using pseudo-entities to generate dynamic communities, in accordance with an embodiment of the invention;

FIG. 26 illustrates a process for using dynamic communities to identify uncommon and/or normal entitlement-eligible entities, in accordance with an embodiment of the invention;

FIG. 27 illustrates a process for determining which entitlement-eligible entities are "uncommon" in a community, in accordance with an embodiment of the invention; and FIG. 28 illustrates a process for determining which entitlement-eligible entities are "normal" in a community, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (e.g., a computer-implemented process, a business process, or any other process), apparatus (including a device, machine, system, computer program product, and/or any other apparatus), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or medium. More specific examples of the computer readable medium include, but are not limited to, the following: an electrical connection having one or more wires, or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatuses (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function. For example, the processing system 120 illustrated in FIG. 2 and described in greater detail below is, in some embodiments of the invention, configured to perform one or more of the steps of the flow charts or other processes described herein. In some such embodiments of the invention, the processing system 120 is configured to perform the one or more steps by executing computer program instructions of an Entitlement Managing Application 111 stored in a computer-readable medium communicably coupled to the processing system 120. In such embodiments, the Entitlement Managing Application 111 includes computer program instructions that, when executed by the processing system 120, instruct the processing system 120 to perform certain logic and/or communication functions in order to perform the particular process step. In other embodiments of the invention, however, the processing system 120 includes one or more application-specific circuits to perform one or more of the process steps described herein.

As described above, it is often important for an organization to efficiently and accurately monitor and control access to information and resources held and/or maintained by the organization. As illustrated in FIG. 1, in one embodiment of the invention, a system 10 for controlling information and resources held and/or maintained by an organization includes three different sub-systems: an identity management system 20; a system 30 for managing who has access to what information and resources; and a system 40 for monitoring specifically what those with access are doing with that access. These three sub-systems, 20, 30, and 40, monitor and control access to the organization's information and resources from three different angles.

The identity management system 20 is involved with such measures as conducting background checks and/or verifying the identity of those entities that have or may receive access to the organization's resources. The system 30 is involved with monitoring who currently has access to which of the organization's resources and controlling the granting and withholding of access to the resources. The system 40 is directed to actually monitoring how those with access rights are actually using their access rights by, for example, asking such questions as: are they using the access, how are they using the access, what information or resources are they using and/or modifying, etc. Embodiments of the present invention are primarily directed to, but not limited to, systems, methods, and computer program products for performing the role of the second sub-system, i.e., the system 30 for monitoring and controlling who has access to what information and resources.

In this regard, embodiments of the present invention are generally directed to systems, methods, and computer program products for monitoring and/or controlling the distribution of "entitlements," where the term "entitlement" generally refers to a distributed resource or the right to access a certain resource in a particular way. For example, in some embodiments of the invention, entitlements include the right to access one or more datasets. For example, in one embodiment of the invention, a particular entitlement may grant the entitlement-holder access to customer information. Other entitlements may grant the entitlement-holder access to other information, such as, for example, access to employee information, access to various levels of confidential or secret information, access to information of various levels of importance, access to financial accounts, access to accounting records, access to pay scales, access to system information, etc. Furthermore, where an entitlement provides access to one or more datasets, the entitlement may grant only read access, only write access, or both read and write access.

In some embodiments of the invention, entitlements include access to one or more areas of a physical or virtual environment, such as access to a physical room or building or access to a virtual data room. In some embodiments, entitlements include computer software or access to computer software. For example, in one embodiment of the invention, an entitlement may provide a person in the organization with access to particular software available on the organization's network. However, it should be appreciated that, in some embodiments, multiple different entitlements can provide access to the same software where, for example, one entitlement grants the entitlement holder greater or lesser capabilities when using the software than another entitlement. It should also be appreciated that, unless specifically stated in the claims, the term entitlement is not intended to be limited to the examples described herein and may comprise other resources or access rights to such resources.

As used herein, the term "organization" generally refers to any business or non-business entity or enterprise comprised of a plurality of discrete units that require access to information and/or resources held and/or maintained by the organization. These discrete units are generally referred to herein as "entitlement-eligible entities" or "members" of the organization. As used herein, the terms "entitlement-eligible entity" and "member" are generally interchangeable.

In one embodiment, the entitlement-eligible entities or members of an organization include persons, which are typically employees of the organization but may also be clients, customers, other organizations, and the like. In some embodiments, the entitlement-eligible entities include computing devices. For example, where entitlements provide software or access to software, then, in one embodiment, the entitlement-eligible entity may be a computer or workstation that will be provided with the software or access to the software instead of a particular person. However, in other embodiments where entitlements provide software or access to software, the software or access thereto may be distributed to specific persons in the organization (or such persons' unique computer profiles) rather than to specific computers or workstations.

Referring again to the figures, FIG. 2 illustrates an entitlement managing system 110 in accordance with an embodiment of the invention. FIG. 2 also illustrates an environment 100 in which the processes described herein may be implemented in accordance with an embodiment of the invention. As illustrated in FIG. 2, one embodiment of the invention comprises a network 102 interconnecting a plurality of computing devices and/or terminals. One or more computing devices 105 operate an entitlement managing system 110. The entitlement managing system 110 is configured to periodically analyze the current distribution of entitlements within an organization in order to automatically identify any "red flag" issues that may require further analysis. In this way, the organization's resources for monitoring entitlements can be more efficiently used by directing the resources to these flagged issues. In some embodiments, the entitlement managing system 110 is also configured to automatically distribute or withdraw entitlements within the organization to address these flagged issues or other issues.

FIG. 3 is a flow diagram illustrating a procedure for more efficiently monitoring and controlling the distribution of entitlements within an organization, in accordance with an embodiment of the invention. In one embodiment, the procedure described in FIG. 3 is implemented by the entitlement managing system 110 of FIG. 2. As illustrated by block 200a, the entitlement-eligible entities within the organization are divided into a plurality of communities and at least one of the plurality of communities is initially selected for analysis.

FIG. 4 is a flow diagram illustrating a procedure for dividing the entitlement-eligible entities into communities and selecting a community in accordance with an embodiment of the invention. As illustrated by block 205 in FIG. 4, information is received regarding all of the entitlement-eligible entities within an organization. Such information may be received from one or more data-providing terminals 130 or directly from one or more entitlement-eligible entities 132 where the entitlement-eligible entities are computers or are represented by computers or computer profiles.

As illustrated by block 210, the entitlement-eligible entities of the organization are then grouped into "communities" based on factors that suggest the members of the same community should have similar entitlement combinations. For example, in one embodiment the communities are determined based on hierarchy within the organization. In this regard, the community groupings may be based on such factors as job function, department or division, rank, level, authority, security clearance, and/or the like. In some embodiments, communities are determined dynamically by grouping entitlement-eligible entities into communities based on the entitlements that each entitlement-eligible entity has in common or does not have in common with other entitlement-eligible entities or pseudo-entities. The methods and devices for creating such dynamic communities based on patterns in the current entitlement distribution are described in greater detail below with reference to FIGS. 19-25.

In some embodiments of the invention, communities are permitted to overlap. As such, in some embodiments a single entitlement-eligible entity may belong to a plurality of communities. For example, FIG. 5 is a simplified illustration of an exemplary organization 250 comprised of a plurality of members/entitlement-eligible entities 260-278. In the illustrated embodiment, the entire organization 250 as a whole makes up one community that is then further divided into smaller communities 252 and 254 based on, for example, both job function and level of authority. For example, suppose that member 271 is a vice-president in the internal auditing department of the organization. As illustrated in FIG. 5, member 265 may be a member of three different communities: one being the organization 250 as a whole, one being vice presidents within the organization 252, and one being the internal auditing department 254. These communities may exist in this way since each of these communities are likely to involve different entitlements from community to community but are also likely to share many entitlements with others within each community.

In some embodiments where communities overlap, a user of the entitlement managing system 110 may be able to create additional communities that are combinations of two or more communities. For example, referring to FIG. 5, a user of the system 110 may be able to analyze a community of entitlement-eligible entities that are members of both the auditing department community 254 and vice president community 252, i.e., a community 256 of vice presidents in the auditing department. In the illustration of FIG. 5, member 271 is the only member of this community 256 of vice presidents in the auditing department.

As illustrated in FIG. 2, the community information 116, including information about the entitlement-eligible entities within the organization and the community or communities to which each entitlement-eligible entity belongs, may be stored in the memory of the computing device 105. In one embodiment, the processing system 120 automatically determines the community information 116 based on data received from one or more data-providing terminals 130. In other embodiments, the community information 116 is determined by another system and provided to the computing device 105 by one or more data-providing terminals 130 via the network 102. In still other embodiments, the processing system 120 attempts to generate communities based on a statistical analysis of the distribution of entitlements within the community, lumping those together that have a certain level of similarity in their combinations of entitlements. Such embodiments of the invention are described in greater detail below with reference to FIGS. 19-22.

As illustrated by blocks 220 and 230 of FIG. 4, once the community information 116 has been established, the processing system 120 selects a particular community to analyze. As described in FIG. 4, in one embodiment of the invention, the selection of a community is based on user input received, for example, from a user input device of the computing device 105. In other embodiments of the invention, the selection of a community is conducted automatically by the processing system 120. Once a community has been selected for analysis, the processing system 120 proceeds to step 300 illustrated in FIG. 3.

As illustrated by block 300 in FIG. 3, the processing system 120 determines, based on a review of the current entitlement distribution within the community, which entitlements within the community are considered "uncommon" within the community and should be flagged. As used herein, a "uncommon" entitlement is generally an entitlement that is determined by the entitlement managing system 110 to be uncommon within the selected community, of potentially high risk within the community, and/or less likely to be present within the selected community and that, therefore, may be unneeded or undesirable within the community or at least should be flagged as requiring specific validation. FIG. 6 provides a flow diagram illustrating a procedure for determining uncommon entitlements currently existing within a community in accordance with an embodiment of the invention. FIGS. 11-18, described in greater detail below, illustrate other embodiments of systems and procedures for determining uncommon entitlements within a community, such as systems and methods configured to generate and use "likelihood ratios."

As illustrated by block 305 in FIG. 6, the processing system 120 receives or accesses information regarding the current entitlement distribution within the selected community. For example, in one embodiment, the current entitlement information 112 is stored in the memory of the computing device 105. In other embodiments, however, the processing system 120 may access this information over the network 102 from one or more other computing systems, such as one or more data-providing terminals 130. The current entitlement information 112 generally contains a listing of the entitlements assigned to each entitlement-eligible entity within the selected community.

As illustrated by block 310 in FIG. 6, the processing system 120 also receives input regarding an uncommon entitlement threshold. The uncommon entitlement threshold may be provided by a user and stored in the normalcy factor datastore 114 in the memory of the computing device 105. In one embodiment of the invention, the uncommon entitlement threshold is community specific. In other embodiments of the invention, however, the same uncommon entitlement threshold is used when analyzing all of the different communities in an organization. In one embodiment, the uncommon entitlement threshold entered by the user is an integer representing the minimum number of entitlement-eligible entities within the selected community that must have a particular entitlement in order for the particular entitlement to not be considered uncommon. In other embodiments, the uncommon entitlement threshold entered by the user is a percentage representing the minimum percentage of entitlement-eligible entities within the selected community that must have a particular entitlement in order for the particular entitlement to not be considered uncommon.

In still other embodiments, the uncommon entitlement threshold is automatically computed by the processing system 120 based on a statistical analysis of the distribution of entitlements within the community and/or other communities. For example, the uncommon entitlement threshold may be computed as being the number of entitlement-eligible entities having an entitlement in common that is some "x" number of standard deviations below the mean number of entitlement-eligible entities having an entitlement in common for the community or the organization.

As illustrated by block 320 in FIG. 6, the processing system 120 analyzes each entitlement within the community to determine whether the number of community members having the entitlement is less than the uncommon entitlement threshold. As illustrated by block 330, any entitlements in the community where the number of community members having the entitlement is less than the uncommon entitlement threshold are flagged as "uncommon" entitlements within the community. Any community members having an uncommon entitlement are also flagged so that these members may be analyzed more closely to determine whether or not they should have access to the uncommon entitlement. Information regarding which entitlements are uncommon in the community and which community members possess uncommon entitlements is stored in an uncommon entitlement information datastore 122 on the computing device 105 or some other computing device.

For example, referring again to the exemplary organization 250 illustrated in FIG. 5, each letter next to an entitlement-eligible entity represents an entitlement assigned to that particular entitlement-eligible entity. For example, entitlement-eligible entity 266 is assigned the four entitlements "A", "B", "C", and "D". It should be appreciated that FIG. 5 is an example of an organization that may be considerably simple compared to organizations that may typically use this system. Specifically, some organizations that use this system may have tens or hundreds of thousands of entitlement-eligible entities and potentially millions of different entitlements.

Supposing that the user of the entitlement managing system 110 selected community 254 in FIG. 5 to analyze and set the uncommon entitlement threshold to two. In such an example, entitlements "E", "F", and "Z" would be determined to be uncommon in this community 254. Members 268 and 271 would also be identified for having uncommon entitlements associated with them. In this way, a person in the organization would not have to analyze the entitlements of each member of the community in order to validate the entitlements assigned to the members of the community. Instead, the person could focus his or her efforts on only analyzing members 268 and 271 to determine if they should be associated with entitlements E, F, and/or Z.

Returning to FIG. 3, as illustrated by block 400, the processing system 120 also determines, based on a review of the current entitlement distribution within the selected community, which entitlements are "normal" within the community, where "normal" entitlements are generally thought of as those entitlements that are so common or likely to exist within the community that they may be considered cornerstone entitlements that may be desirable for everyone in the community to have, or at least may be assumed to be appropriate and, therefore, may not need to be validated. FIG. 7 provides a flow diagram illustrating a procedure for determining "normal" entitlements within a community in accordance with an embodiment of the invention. Although FIG. 3 illustrates that the uncommon entitlements are determined before the normal entitlements are determined, in other embodiments the steps may be reversed or conducted simultaneously. FIGS. 11-18, described in greater detail below, illustrate other embodiments of systems and procedures for determining normal entitlements within a community, such as systems and methods configured to generate and use "likelihood ratios."

As illustrated by block 405 in FIG. 7, the processing system 120 receives or accesses information regarding the current entitlement distribution within the selected community. For example, in one embodiment the current entitlement information 112 is stored in the memory of the computing device 105. In other embodiments, however, the processing system 120 may access this information over the network 102 from one or more other computing systems, such as one or more data-providing terminals 130. The current entitlement information 112 generally includes a listing of the entitlements assigned to each entitlement-eligible entity within the selected community.

As illustrated by block 410 in FIG. 7, the processing system 120 also receives input regarding a normal entitlement threshold. The normal entitlement threshold may be provided by a user and stored in the normalcy factor datastore 114 in the memory of the computing device 105. In one embodiment, the normal entitlement threshold is community-specific. In other embodiments, however, the same normal entitlement threshold is used when analyzing all of the different communities in an organization. In one embodiment, the normal entitlement threshold entered by the user is an integer representing the minimum number of entitlement-eligible entities within the selected community that must have a particular entitlement in order for the particular entitlement to be considered normal. In other embodiments, the normal entitlement threshold entered by the user is a percentage representing the minimum percentage of entitlement-eligible entities within the selected community that must have a particular entitlement in order for the particular entitlement to be considered normal.

In still other embodiments, the normal entitlement threshold is automatically computed by the processing system 120 based on a statistical analysis of the distribution of entitlements within the community and/or other communities. For example, the normal entitlement threshold may be computed as being the number of entitlement-eligible entities having an entitlement in common that is some "x" number of standard deviations above or below the mean number of entitlement-eligible entities having an entitlement in common for the community or the organization. In another embodiment, an entitlement may be considered "normal" if it is shared by a majority of the community members.

In some embodiments, the normal entitlement threshold and the uncommon entitlement threshold are the same; however, in most embodiments the normal and uncommon thresholds will be different with some entitlements falling in a third category of entitlements that are not uncommon enough to be considered uncommon, but are also not common enough to be the "normal" cornerstone-type entitlements in the community either.

As illustrated by block 420 in FIG. 7, the processing system 120 analyzes each entitlement within the community to determine whether the number of community members having the entitlement is greater than or equal to the normal entitlement threshold. As illustrated by block 430, any entitlements in the community where the number of community members having the entitlement is greater than or equal to the normal entitlement threshold are flagged as "normal" entitlements within the community. In one embodiment, any community members not having a certain normal entitlement are also flagged so that these members may be analyzed more closely to determine whether or not they should have access to the normal entitlement. Information regarding which entitlements are normal in the community and which community members do not possess normal entitlements is stored in a normal entitlement information datastore 124 on the computing device 105 or some other computing device.

For example, referring again to the exemplary organization 250 illustrated in FIG. 5, suppose that the normal entitlement threshold for all three communities shown 250, 252, and 254 is set at 50% of the members in the community. In such an example, entitlements "A", "B", and "C" would be determined to be normal in the organization 250 as a whole. Entitlements "A" and "E" would be determined to be normal in community 252. Entitlements "A", "B", "C", and "D" would be normal in community 254. As described above, members in a community that do not have all of the entitlements considered to be normal in the community may also be identified. For example, in FIG. 5, members 273 and 274 would be identified in community 252 for not having at least one of the normal entitlements "A" and "E". In this way, a person in the organization in charge of managing entitlements can focus his or her resources on members 273 and 274 to try and determine whether they should have entitlements "A" and "E" like the rest of community 252.

Returning again to FIG. 3, after the normal and uncommon entitlements are determined for the selected community, the entitlement managing system 110 determines the extent to which the community is "infected" based on the number of uncommon entitlements discovered within the community or the number of community members having an uncommon entitlement, as illustrated by block 500 in FIG. 3. Specifically, as described above, the entitlement managing system 110 determines the uncommon entitlements and the community members having uncommon entitlements in step 300 of the procedure illustrated in FIG. 3. The entitlement managing system 110 then determines a community infection indicator that is, for example, the number or percentage of uncommon entitlements existing within the community or the number or percentage of entitlement-eligible entities in the community having uncommon entitlements. This indicator and/or other information regarding the extent that the community is infected with uncommon entitlements are stored in a community infection information datastore 126 on the computing device 105. This information can then be used to indicate to the entitlement administrators in the organization which communities should be targeted first for more-detailed entitlement review and validation procedures. A very high infection rate, however, could also indicate other information such as a poorly defined community.

As illustrated by block 200*b* of FIG. 3, after the selected community is analyzed, the entitlement managing system 110 may determine and select another community of entitlement-eligible entities in the organization to analyze. After the entitlement managing system 110 has finished analyzing some or all of the communities in the organization, the entitlement administrator(s) can begin investigating whether uncommon entitlements should be taken away from the respective entitlement-eligible entities that posses them, as illustrated by block 600 of FIG. 3. As described above, the administrator(s) may choose to address the communities based on the determined infection rate, going from the most severely infected communities to the least. In this regard, the entitlement managing system 110 may publish a list or map of infected communities ranked and/or color-coded based on infection rate.

In some embodiments, the entitlement managing system 110 automatically notifies certain persons in the organization regarding the discovery of uncommon entitlements. In other embodiments, however, the entitlement managing system 110 also handles the withholding or taking away of entitlements automatically. For example, in one embodiment of the invention, the entitlement managing system 110 automatically withholds, withdraws, or suspends entitlements determined to be uncommon. However, in some embodiments, where communities within the organization overlap, an entitlement-eligible entity that is a member of two or more communities may have an entitlement that was determined to be uncommon in one community but normal, or at least acceptable, in the other community. In such a situation, the entitlement managing system 110 may be configured to recognize that the entitlement-eligible entity should have the uncommon entitlement based on his membership in the second community. As such, the entitlement managing system 110 will not flag the entitlement as uncommon, provided that, as described below, the possession of the uncommon entitlement does not create compliance issues regarding any known rules or regulations.

For example, referring again to FIG. 5, in one embodiment, the entitlement managing system 110 might initially identify entitlements "E" and "F" associated with member 271 as uncommon in community 254. The entitlement managing system 110, however, may then recognize that member 271 is also a member of community 252 where entitlement "E" is considered normal in that community. In such an embodiment, the entitlement managing system 110 may be configured to not identify member 271 as having an uncommon entitlement "E" if having such an entitlement does not violate some other predetermined rule. Entitlement "F" associated with member 271, however, would still be considered uncommon and, in one embodiment of the entitlement managing system 110, is automatically removed from member 271 by the system 110.

As illustrated by block 700 of FIG. 3, the entitlement administrator(s) may also use the information stored in the normal entitlement information datastore 124 to determine whether entitlements determined to be normal to a community should be distributed to other entitlement-eligible entities within the community. In one embodiment, the entitlement managing system 110 distributes or authorizes the distribution of normal entitlements automatically to those entitlement-eligible entities that do not have the entitlements determined to be normal within their communities. For example, referring to FIG. 5, in one embodiment of the entitlement managing system 110, the system 110 automatically assigns entitlement "C" to member 271 since entitlement "C" is normal in community 254.

FIG. 8 is a flow diagram illustrating a procedure for automatically determining whether any entitlements or combinations of entitlements in an organization create any compliance issues for the organization, in accordance with an embodiment of the invention. As described above, in some instances there are internal and/or external rules and regulations that may affect the distribution of entitlements within an organization. For example, an external law may exist that says the same person should not have access to both datasets A and B at the same time. Such a law could be stored in a rules and regulations datastore 118 on the computing device 105 and then used by the entitlement managing system 110 to automatically determine compliance issues within the organization. In another example, a background check of an employee could indicate a security risk and an internal rule within the organization may limit access to certain datasets to a certain level of security risk. If this rule is provided to the entitlement managing system 110, the system could automatically monitor such compliance issues, as illustrated by blocks 800 and 810 of FIG. 8. If the system 110 identifies a compliance issue, it stores information regarding the compliance issue into datastore 128 and may be configured to automatically notify an appropriate person in the organization, as illustrated by block 820 of FIG. 8. The system 110 may further be configured to automatically correct the compliance issue where possible, as illustrated by block 830 of FIG. 8.

FIG. 9 illustrates an exemplary graphical user interface for allowing a user to input information into the entitlement managing system 110 in order to more efficiently analyze the entitlements within an organization, in accordance with an embodiment of the invention. In the illustrated embodiment the "Hier Level" stands for the "hierarchy level" and, in this example, is the parameter that defines the community being examined. In the illustrated example, the Hier Level is set at "4" meaning it will take an organizational hierarchy code and define communities based on 4-dot associations. For example, for an organization with a hierarchy code of "FNVAC . . . ," "A" will be defined as Community FNVA.

The "Community Membership Requirement" parameter in the user interface is, in this example, equivalent to the uncommon entitlement threshold described above. In some embodiments, this parameter can either be an integer or a percentage value. In this example, with a value of "2," this parameter translates to mean that if less than two members of the community share a common entitlement the entitlement will be determined to be uncommon for the community.

The "Friend" parameter in FIG. 9 is, in this example, equivalent to the normal entitlement threshold described above and is meant to define a cornerstone entitlement. In the illustrated example the value is "5" meaning that, if five or more members share a common entitlement, the entitlement is a considered to be a population norm and is a cornerstone for the community. The input files shown in FIG. 8 are the files that have entitlement-eligible entity information, entitlement information, and community information (i.e., hierarchy information) stored therein.

FIGS. 10a and 10b illustrate graphical user interfaces providing exemplary output showing the results of the entitlement analysis performed in accordance with an embodiment of the present invention. As illustrated in FIGS. 10a and 10b, after the entitlement managing system 110 runs its analysis the output will display information regarding the community or communities at a macro level. This is the macro information about the communities given the bias from the input step.

FIG. 10a illustrates the results generated from an analysis of a community at the 3-dot level with 1,230 unique entitlements ("platforms") in the community and 111 unique entitlement-eligible entities ("users"). FIG. 10a also states that, if a full analysis was to be done at the population level, 4,532 entitlement combinations would have to be analyzed. However, by using the entitlement managing system 110 and the community bias shown in FIG. 9, only twenty users show uncommon entitlement associations. Therefore, the entitlement administrators in the organization can focus on these twenty users instead of the 111 users in the community. This translates to an 81.98% efficiency gain over analyzing the entire community population, which is what traditionally has been done.

FIG. 10b illustrates an example where the Hier Level is increased to "4." As such, six communities are defined and the efficiency gain drops to 73.87%. This figure also illustrates how infection rates can be used to judge the portfolio of communities. The infection rates in FIG. 10b highlight that communities FNVA and FVNE have the highest infection rates and should be analyzed with the highest priority.

FIG. 10c illustrates a second component of the user output of the analysis which illustrates information at the micro level, in accordance with an embodiment of the invention. FIG. 10c illustrates the uncommon entitlements identified for a particular individual in the community. With this information, an entitlement administrator can contact the individual to determine if she needs any of the entitlements and, if so, why she needs it when few others in her community do. In many cases, these uncommon entitlements will be legacy entitlements or otherwise old, forgotten, or misplaced entitlements that the individual should not need.

Using "Likelihood Ratios" to Determine Uncommon and/or Normal Entitlements

The embodiments of the invention described above generally involve identifying the number/percentage of entitlement-eligible entities in a community that have a particular entitlement and comparing that number/percentage to one or more threshold values to determine whether the entitlement is normal, uncommon, neutral, high risk, low risk, etc. Other embodiments of the invention, however, involve other techniques for automatically classifying entitlements within a community. For example, FIG. 11 illustrates a process 1100 for calculating "likelihood ratios" to determine "normal" and/or "uncommon" entitlements within a community, in accordance with one embodiment of the invention.

As represented by block 1110, a community is selected. For example, a community within an organization may be selected based on a particular hierarchy code, division, line-of-business, and/or the like. In some embodiments, a community is selected that was built dynamically based at least partially on other dynamic factors such as the distribution of entitlements within the organization. Such communities are referred to herein as "dynamic communities" and include those described herein with reference to FIGS. 19-25. In some embodiments of the invention, a user selects a community using a user input device and the input is used by the processing system 120 to retrieve information 116 about the selected community. In other embodiments, the community is selected automatically by the processing system 120. For example, the processing system 120 may periodically perform the process 1100 for each community within the organization.

As represented by block 1120, an entitlement existing within the selected community is selected. For example, in an embodiment of the present invention, the processing system 120 identifies all of the entitlements currently associated with members of the selected community and begins by selecting one of the entitlements.

As represented by block 1130, the processing system 120 then calculates the likelihood of the selected entitlement being in the selected community rather than outside of the community. In one embodiment, this calculation involves the processing system 120 calculating a "likelihood ratio" according to the following equation:

Likelihood Ratio=(% in community with entitlement)/(% outside community with entitlement)

More particularly, as represented by block 1132, the processing system 120 uses the information 112 stored about current entitlements to determine the percentage of entitlement-eligible entities within the community that have the selected entitlement. As represented by block 1134, the processing system 120 also uses the information 112 stored about current entitlements to determine the percentage of entitlement-eligible entities outside the community that have the selected entitlement. As represented by block 1136, the processing system 120 then calculates the likelihood ratio by dividing the percentage of entitlement-eligible entities within the community having the entitlement by the percentage of entitlement-eligible entities outside the community having the entitlement. The calculated likelihood ratio is then stored along with the selected community and the entitlement in the likelihood ratio datastore 129 in the entitlement managing system's memory.

As represented by decision diamond 1140, if the likelihood ratio has not been calculated for each of the entitlements existing within the selected community, then the process returns to block 1120, where another entitlement is selected. In other words, the processes represented by blocks 1120 and 1130 are repeated so that likelihood ratios are calculated for each entitlement that exists in the selected community.

As represented by block 1150, the calculated likelihood ratios are then used by the processing system 120 and/or a user of the entitlement managing system 110 to determine which entitlements in the selected community are normal and/or uncommon, as these terms are defined above. For example, FIG. 12 illustrates a process 1200 for using likelihood ratios to determine which entitlements are "uncommon" in a community, in accordance with an embodiment of the invention. Similarly, FIG. 13 illustrates a process 1300 for using likelihood ratios to determine which entitlements are "normal" in a community, in accordance with an embodiment of the invention.

As illustrated by block 1210 in FIG. 12, the processing system 120 receives or accesses information regarding the likelihood ratios for each entitlement within the selected community. For example, in one embodiment, the current entitlement information 129 is stored in the memory of the computing device 105. In other embodiments, however, the processing system 120 may access this information over the network 102 from one or more other computing systems, such as one or more data-providing terminals 130.

As illustrated by block 1220 in FIG. 12, the processing system 120 also receives input regarding an uncommon entitlement threshold. The uncommon entitlement threshold may be provided by a user and stored in the normalcy factor datastore 114 in the memory of the computing device 105. In one embodiment of the invention, the uncommon entitlement threshold is community specific. In other embodiments of the invention, however, the same uncommon entitlement threshold is used when analyzing all of the different communities in an organization. In one embodiment, the uncommon entitlement threshold entered by the user is an integer or other number representing the minimum likelihood ratio value within the selected community in order for an entitlement not to be considered uncommon. For example, in one embodiment, the uncommon entitlement threshold is the number "one." Using the equation for likelihood ratio described above, an entitlement having a likelihood ratio of "one" means that the entitlement is no more or less likely to exist within or outside of the community. However, a value greater than one indicates that the entitlement is more likely to exist within the community than outside the community, and a value less than one indicates that the entitlement is less likely to exist within the community than outside the community. Therefore, a likelihood ratio value greater than one is more likely to indicate a normal entitlement for that community and a likelihood ratio value less than one is more likely to indicate an uncommon entitlement for that community.

In still other embodiments, the uncommon entitlement threshold is automatically computed by the processing system 120 based on a statistical analysis of the distribution of likelihood ratio values within the community and/or other communities. For example, the uncommon entitlement threshold may be computed as being the likelihood ratio value that is some "x" number of standard deviations below the mean likelihood ratio value for the community or the organization.

As illustrated by block 1230 in FIG. 12, the processing system 120 analyzes each entitlement within the community to determine any and all entitlements in the community having a likelihood ratio value less than the uncommon entitlement threshold. As illustrated by block 1240, any entitlements in the community where the likelihood ratio is less than the uncommon entitlement threshold are flagged as "uncommon" entitlements within the community. Any entitlement-eligible entities having an uncommon entitlement may also be flagged so that these members may be analyzed more closely to determine whether or not they should have access to the uncommon entitlement. Information regarding which entitlements are uncommon in the community and which community members possess uncommon entitlements is stored in an uncommon entitlement information datastore 122 on the computing device 105 or some other computing device.

Referring now to FIG. 13, the processing system 120 similarly determines, based on the likelihood ratios calculated for the entitlements in the selected community, which entitlements are "normal" within the community. More particularly, as illustrated by block 1310 in FIG. 13, the processing system 120 receives or accesses information regarding the likelihood ratios for each entitlement within the selected community. For example, in one embodiment, the current entitlement information 129 is stored in the memory of the computing device 105. In other embodiments, however, the processing system 120 may access this information over the network 102 from one or more other computing systems, such as one or more data-providing terminals 130.

As illustrated by block 1320 in FIG. 13, the processing system 120 also receives input regarding a normal entitlement threshold. The normal entitlement threshold may be provided by a user and stored in the normalcy factor datastore 114 in the memory of the computing device 105. In one embodiment of the invention, the normal entitlement threshold is community specific. In other embodiments of the invention, however, the same normal entitlement threshold is used when analyzing all of the different communities in an organization. In one embodiment, the normal entitlement threshold entered by the user is an integer or other number representing the minimum likelihood ratio value within the selected community in order for an entitlement to be considered normal. For example, in one embodiment, the normal entitlement threshold is fifty. Using the equation for likelihood ratio described above, an entitlement having a likelihood ratio of fifty means that the entitlement is fifty times more likely to exist within the community rather than outside the community. Therefore, a likelihood ratio value of fifty or greater may, in some communities, be a strong indication of a normal entitlement for that community. In another exemplary embodiment of the invention, the normal entitlement threshold is one.

In still other embodiments, the normal entitlement threshold is automatically computed by the processing system 120 based on a statistical analysis of the distribution of likelihood ratio values within the community and/or other communities. For example, the normal entitlement threshold may be computed as being the likelihood ratio value that is some "x" number of standard deviations above or below the mean likelihood ratio value for the community or the organization.

As illustrated by block 1330 in FIG. 13, the processing system 120 analyzes each entitlement within the community to determine any and all entitlements in the community having a likelihood ratio value greater than the normal entitlement threshold. As illustrated by block 1340, any entitlements in the community where the likelihood ratio is greater than the normal entitlement threshold are flagged as "normal" entitlements within the community. Any entitlement-eligible entities not having a normal entitlement may also be flagged so that these members may be analyzed more closely to determine whether or not they should have access to the normal entitlement. Information regarding which entitlements are normal in the community and which community members do not possess one or more normal entitlements is stored in a normal entitlement information datastore 124 on the computing device 105 or some other computing device.

In some embodiments, the normal entitlement threshold and the uncommon entitlement threshold are the same; however, in most embodiments the normal and uncommon thresholds will be different with some entitlements falling into a third category of entitlements that are not unlikely enough to be considered "uncommon," but are also not likely enough to be considered "normal" cornerstone-type entitlements in the community either.

FIG. 14 illustrates a table 1400 showing an example of the likelihood ratios and other entitlement information generated for a particular community, in accordance with an embodiment of the invention and the processes described above with reference to FIGS. 11-13. In some embodiments of the invention, the processing system 120 uses the likelihood ratios and thresholds to make automatic determinations about which entitlements are normal and/or uncommon and/or to automatically add or remove certain entitlements from certain entities. In some embodiments of the invention, a user of the computing device 105 is involved in the process or reviews the process. In such embodiments, the table illustrated in FIG. 14 or a similar table may be displayed to a user through a graphical user interface.

FIG. 14 represents a table 1400 showing all of the entitlements within a particular community and each entitlement's likelihood ratio calculated as described above with reference to FIG. 11, in accordance with an embodiment of the invention. The table 1400 also shows other information about each entitlement, such as: (1) "count in community" which represents the number of entities in the community having the particular entitlement; (2) "count outside community" which represents the number of entities outside the community having the particular entitlement; (3) "percent in community" which represents the percentage of entities in the community having the particular entitlement; (4) "percent outside community" which represents the percentage of entities outside the community having the particular entitlement; and (5) the name of each entitlement or some other entitlement identifier. It should be noted that, in some embodiments of the invention, where a count or percentage is zero, a very small value is assumed by the processing system 120 in order to avoid dividing by zero when calculating the likelihood ratio.

The likelihood ratios identified within circle 1410 show entitlements that may be considered normal within the community due to relatively high likelihood ratios. For example, Entitlement A is approximately five-hundred and sixty-two times more likely to exist within this community than outside the community. Therefore, in this example embodiment of the invention, Entitlement A is normal in the community and likely to be a core entitlement for members of the community that all or most community members should have.

The likelihood ratios identified within the circle 1430 show entitlements that may be considered uncommon within the community due to relatively low likelihood ratios. For example, Entitlement T is approximately four and a half times less likely to exist within this community than outside the community. Therefore, in this example embodiment of the invention, Entitlement T is uncommon in the community and likely to be not needed by members of the community and/or to present a risk if held by members of the community.

FIG. 14 illustrates how, even though there may only be a seemingly small number (e.g., five) of community members having a particular entitlement, the entitlement may still be identified as normal using the likelihood ratio because little or no entities outside the community may posses the particular entitlement. Likewise, even though there may be a seemingly large number of members of the community having a particular entitlement, it still may not mean that the entitlement is "normal" since the large number may represent a small percentage of the community members and/or the number or percentage of entities outside the community having the same entitlement may be much larger.

In some embodiments of the invention, the likelihood ratio technique described in FIGS. 11-13 is used in conjunction with other techniques for identifying normal and/or uncommon entitlements, such as the techniques described above with reference to FIGS. 6-8, since combining the techniques may more accurately designate entitlements properly as normal and/or uncommon entitlements. For example, as illustrated in FIG. 14, the entitlements represented within circle 1420 may be considered uncommon in one embodiment, even if the uncommon entitlement threshold used in the process described in FIG. 12 is "one" and these entitlements have likelihood ratios greater than one. This may be so since the processing system 120 may also have another uncommon entitlement threshold and rule that identifies entitlements as uncommon if there is only one community member, or some other small number or percentage of community members, that has the entitlement. Such entitlements may present a risk to the organization and therefore may be marked as uncommon in some embodiments of the invention even though the likelihood ratio may be relatively high or significantly greater than one or some other threshold.

Determining Uncommon and Normal Entitlements with Regard to a Community Transfer Entitlement issues often arise within an organization when an entitlement-eligible entity within the organization transfers from one community to another, i.e., from an "old" community to a "new" community. The embodiments of the invention described above may be used to determine which entitlements are likely to be normal in the new community and which are likely to be uncommon before or after the transfer takes place. FIGS. 15-18, however, illustrate other processes for specifically managing entitlements before, during, and/or after a transfer of an entity from one community to another. For example, FIG. 15 illustrates a process 1500 for calculating "likelihood ratios" to determine "normal" and/or "uncommon" entitlements specifically for an entitlement-eligible entity that has transferred or is going to transfer from one community to another, in accordance with one embodiment of the invention.

As represented by block 1510, a first and a second community are selected. In one embodiment, the first community is selected to be the community to which one or more entitlement-eligible entities are transferring, i.e., the "new" community. In one embodiment, the second community is selected to be the community from which the one or more entitlement-eligible entities are transferring, i.e., the "old" community. A community within an organization may be selected based, for example, on a particular hierarchy code, division, line-of-business, and/or the like. In some embodiments, the community is a dynamic community, such as those described herein below with reference to FIGS. 19-25. In some embodiments of the invention, a user selects a community using a user input device and the input is used by the processing system 120 to retrieve information 116 about the selected community. In other embodiments, the community is selected automatically by the processing system 120. For example, the processing system 120 may perform the process 1500 whenever a transfer of personnel takes place within the organization or whenever a regeneration of dynamic communities (described below with reference to FIGS. 19-22) causes one or more entities to move into new communities.

As represented by block 1520, an entitlement associated with an entitlement-eligible entity transferring from the second community to the first community is selected. For example, in an embodiment of the present invention, a user of the processing system 120, or the processing system 120 itself, identifies a member of the second community that has transferred or is going to transfer from the second community into the first community. The processing system 120 then identifies all of the entitlements currently associated with the transferred/transferring entitlement-eligible entity and begins by selecting one of the entitlements.

As represented by block 1530, the processing system 120 then calculates the likelihood of the selected entitlement being in the first (e.g., new) community rather than the second (e.g., "old") community. In one embodiment, this calculation involves the processing system 120 calculating a "likelihood ratio" according to the following equation:

Likelihood=(% in first community with entitlement)/(% in second community with entitlement)

More particularly, as represented by block 1532, the processing system 120 uses the information 112 stored about current entitlements to determine the percentage of entitlement-eligible entities within the first community that have the selected entitlement. As represented by block 1534, the processing system 120 also uses the information 112 stored about current entitlements to determine the percentage of entitlement-eligible entities within the second community that have the selected entitlement. As represented by block 1536, the processing system 120 then calculates the likelihood ratio by dividing the percentage of entitlement-eligible entities within the first community by the percentage of entitlement-eligible entities within the second community. The calculated likelihood ratio is then stored along with the first community and the selected entitlement in the likelihood ratio datastore 129 in the entitlement managing system's memory.

As represented by decision diamond 1540, if the likelihood ratio has not been calculated for each of the entitlements associated with the transferred/transferring entitlement-eligible entity, then the process returns to block 1520, where another entitlement associated with the entitlement-eligible entity is selected. In other words, the processes represented by blocks 1520 and 1530 are repeated so that likelihood ratios are calculated for each entitlement associated with the transferred/transferring entitlement-eligible entity.

As represented by block 1550, the calculated likelihood ratios are then used by the processing system 120 and/or a user of the entitlement managing system 110 to determine which of the entitlements currently associated with the transferred/transferring entitlement-eligible entity are/will be normal (and may not need to be validated or may be automatically retained) and/or are/will be uncommon (and may need to be individually validated or automatically removed) after the transfer into the first community. For example, FIGS. 12 and 13 illustrate a first process 1200 and a second process 1300, respectively, for using likelihood ratios to determine which entitlements are "uncommon" and "normal" in a community using uncommon and normal entitlement thresholds, in accordance with an embodiment of the invention.

FIG. 16 illustrates a table 1600 showing the likelihood ratios and other entitlement information generated for a particular entitlement-eligible entity that has transferred or is transferring from one community to another, in accordance with an embodiment of the invention. For example, in one embodiment of the invention, the table 1600 is generated as a result of the process described with reference to FIG. 15. In some embodiments of the invention, the processing system 120 uses the likelihood ratios and thresholds to make automatic determinations about which entitlements are normal and/or uncommon and/or to automatically add or remove certain entitlements from certain entities. In some embodiments of the invention, a user of the computing device 105 is involved in the process or reviews the process. In such embodiments, the table illustrated in FIG. 16 or a similar table may be displayed to a user through a graphical user interface.

FIG. 16 represents a table 1600 showing all of the entitlements associated with a particular entitlement-eligible entity and each entitlement's likelihood ratio calculated as described above with reference to FIG. 15, in accordance with an embodiment of the invention. The table 1600 also shows other information about each entitlement, such as: (1) "percent in new community" which represents the percentage of entities in the new community (i.e., the community that the entity is transferring into) that have the particular entitlement; (2) "percent in old community" which represents the percentage of entities in the old community (i.e., the community that the entity is transferring from) that have the particular entitlement; and (3) the name of each entitlement or some other entitlement identifier. It should be noted that, in some embodiments of the invention, where a count or percentage is zero, a very small value is assumed by the processing system 120 in order to avoid dividing by zero when calculating the likelihood ratio.

The likelihood ratios identified within circle 1610 show entitlements that may be considered normal within the new community due to relatively high likelihood ratios. For example, Entitlement A is approximately two-hundred and forty-five times more likely to exist within the new community than within the old community. Therefore, in one embodiment, Entitlement A is normal in the new community and likely to be a core entitlement for members of the new community that all or most community members should have. As such, the processing system 120 and/or a user of the processing system 120 may determine from this likelihood ratio that Entitlement A does not need to be reviewed before, during, and/or after the transfer into the new community since it is core to the new community.

The likelihood ratios identified within the circle 1620 show entitlements that may be considered uncommon within the new community due to relatively low likelihood ratios. For example, Entitlement O is approximately seven times less likely to exist within the new community than within the old the community. Therefore, in one embodiment, Entitlement O is considered to be uncommon in the new community and likely to be not needed by members of the new community and/or likely to present a risk if held by members of the community. As such, the processing system 120 and/or a user of the processing system 120 may determine from this likelihood ratio that Entitlement O does need to be removed or at least reviewed before, during, and/or after the transfer into the new community since it is uncommon in the new community. Likewise, as highlighted by circle 1630, some of the entitlements in this example do not exist in the new community. In other words, this entitlement-eligible entity would be the only entity in the new community with these entitlements. This indicates a potential risk and thus these entitlements are, in one embodiment, determined to be uncommon and are either removed and/or reviewed.

FIG. 17 illustrates another process 1700 of determining "normal" and/or "uncommon" entitlements for an entitlement-eligible entity that has transferred or is transferring into a particular community, in accordance with an embodiment of the invention. The process illustrated by FIG. 17 generally uses the benefit of past entitlement decisions, such as decisions made, approved, and/or validated by an entitlement manager, to make more-accurate determinations about normal and uncommon entitlements going forward.

As represented by block 1710, in one embodiment of the invention, the processing system 120 records the history of approved entitlement decisions whenever entitlement-eligible entities transfer from one community to another. As represented by block 1720, a community is then selected to analyze. In one embodiment, a user of the computing device 105 enters input indicating the selected community to analyze. In other embodiments, the processing system 120 selects a community automatically, such as whenever an entity transfers between communities in an organization, or the processing system 120 analyzes each and every community periodically.

As represented by block 1730, an entitlement is selected. For example, in an embodiment of the present invention, the processing system 120 identifies all of the entitlements that have ever existed within the organization, or some other group of entitlements, and selects a first entitlement to analyze.

As represented by block 1740, the processing system 120 then looks at the recorded history of entity transfers within the organization and decisions regarding the entitlements involved in these transfers and then sums-up the number of times that the selected entitlement was: (1) removed from an entity when the entity transferred into the selected community; (2) retained by the entity after the entity transferred into the selected community; and (3) added to an entity when the entity transferred into the selected community.

As represented by decision diamond 1745, the processing system 120 then considers whether there are other entitlements in the selected community that have not been analyzed and need to be analyzed. If there are, then the processing system 120 may return to block 1730 and then block 1740 where another entitlement in the selected community is selected and where sums are then generated for the selected entitlement from the recorded transfer history.

As represented by block 1750, the sums generated during step 1740 are then used to determine normal and/or uncommon entitlements for an entity transferring into the selected community. In some embodiments, the processing system 120 makes these determinations based on certain normal and/or uncommon thresholds and/or on certain predefined rules and relationships between the different sums. In some embodiments, the processing system 120 presents the sums to a user of the computing device 105 who then makes the determinations based on one or more of these sums.

For example, FIG. 18 illustrates a table 1800 and possible graphical user interface output showing entitlement information generated from the process 1700 described in FIG. 17, in accordance with an embodiment of the invention. Specifically, the table 1800 shows an example of information that may be generated from FIG. 17 for a hypothetical community "A." The example table 1800 includes a column showing each entitlement's name and, for each entitlement: (1) a "count removed," which is the number of these entitlements removed from an entitlement-eligible entity upon transfer of the entity into community "A;" (2) a "count retained," which is the number of these entitlements retained by an entitlement-eligible entity during a transfer of the entity into community "A;" and (3) a "count added," which is the number of these entitlements added to an entitlement-eligible entity upon transfer of the entity into community "A."

These three numbers in table 1800 can then be used when an entitlement-eligible entity is transferring or has transferred into community "A" in order to determine which entitlements are likely to be uncommon and should be removed or at least reviewed, which entitlements are likely to be normal and should be added or considered for addition, and which entitlements are possibly "neutral" in that there seems to be little correlation between the particular entitlement and community "A" one way or the other. For example, circle 1810 in FIG. 18 highlights Entitlements A and B, which do not show any significant trends for dealing with these entitlements whenever entities with these entitlements transfer into community A. Since many of these entitlements are removed, many retained, and little added, it appears as though these entitlements are not very dependent on this community. Circle 1820, however, highlights Entitlements D and E that, in this example, appear to be uncommon entitlements for community A since most of these entitlements are removed from entities that enter this community. On the other hand, circle 1840 highlights Entitlements O, P, and Q that, in this example, appear to be normal entitlements for community A since these entitlements are usually retained by entities that enter the community or, if an entity did not already have the entitlement, added to the entity upon entering the community. Circle 1830 highlights certain other entitlements where the entitlement is always removed and never retained or added whenever an entity enters the community. It is clear from table 1800 that these entitlements identified by circle 1830 should almost always, if not always, be removed from entities entering or existing in community A, or at a minimum, a high priority should be placed on a review of these entitlements and/or entities.

Dynamic Community Generation

As described above, in some embodiments of the invention, communities are defined in an organization by, for example, different lines-of-business, divisions, job titles, hierarchies, project teams, job descriptions, duties, etc. In general, such communities are predefined by the organization and are static or semi-static. When defined as such, a person entering the organization is usually assigned to one or more of the predefined communities and from time to time may transfer from one predefined community to another. Other embodiments of the invention, however, involve the creation of "dynamic communities" that are generated based a current (e.g., a real time, near-real time, or recent) distribution of entitlements within the organization. These dynamic communities are, in one example, groups of entitlement-eligible entities that have similar entitlements and/or entitlement combinations. For example, in one embodiment of the invention, dynamic communities are generated by calculating how well the combination of entitlements assigned to each entitlement-eligible entity correlates with the combination of entitlements assigned to each other entitlement-eligible entity in the organization. In another embodiment of the invention, dynamic communities are generated by calculating how well the combination of entitlements assigned to each entitlement-eligible entity correlates with the combination of entitlements associated with each of one or more pseudo-entities, where the pseudo-entities have, in one embodiment, a user-defined combination of entitlements. In some embodiments of the invention, correlation between two entities, regardless of whether they are real entities or pseudo-entities, is calculated as a function of the number of entitlements that two entities have in common and the number of entitlements that the entities do not have in common.

It will be appreciated that dynamic communities determined based on entitlement distribution may result in communities that cross other conventional boundaries in an organization. For example, a single dynamic community determined as described herein may include members of different lines of business, with different job titles, and/or from different projects. As such, in some embodiments of the invention, the dynamic communities may result in a more accurate depiction of the roles and communities that exist within an organization and, when coupled with the processes described herein for identifying normal and/or uncommon entitlements, may result in more accurate and meaningful determinations of likelihood values, uncommon entitlements, and/or normal entitlements. In this regard, it will be appreciated that the processes described herein with reference to FIGS. 1-18 may, in some embodiments, utilize dynamic communities such as those generated from procedures described herein with reference to FIGS. 19-25.

In some embodiments of the invention, the dynamic communities are computed and re-computed periodically, based on real-time or near-real-time entitlement information, and often enough to capture the latest changes within the organization. In this way, the communities and the entitlement managing system 110 remain up-to-date despite changes in the organization. Furthermore, because the dynamic communities are based on actual entitlement distribution, embodiments of the invention can recognize changes in the organization even though an entity may not officially change roles, groups, jobs, lines of business, etc., within the organization. In this way, some embodiments of the invention can identify risks in an organization that would not be identified if communities were only examined based on such predefined communities as lines of business, job title, hierarchy code, division, project, or the like.

Having thus described dynamic community generation generally, FIG. 19 illustrates a process 1900 for generating dynamic communities in accordance with an embodiment of the invention. As represented by block 1910, the processing system 120 calculates the correlation of entitlements between every two entitlement-eligible entities within an organization. As represented by block 1920, the processing system 120 then identifies and/or updates dynamic communities based on the correlation calculations from step 1910 and on certain rules stored in the rules and regulations datastore 118. As represented by block 1930, the processing system 120 may then wait some period of time and then repeat steps 1910 and 1920 again, and so on. In this way, the dynamic communities remain sufficiently up-to-date and automatically capture changes that occur within the organization.

FIG. 20 illustrates an exemplary process 2000 of calculating a value representing the correlation of entitlements between two entitlement-eligible entities, in accordance with an embodiment of the invention. In one embodiment of the invention, the process 2000 is performed during step 1910 of the process 1900 illustrated in FIG. 19.

As represented by block 2010 of FIG. 20, the processing system 120 selects a first entitlement-eligible entity and a second entitlement-eligible entity. For example, in one embodiment of the invention, the processing system calculates correlations between every two entities existing within the organization. In such an embodiment, the processing system 120 may automatically select two entitlement-eligible entities based on which combinations of entitlement-eligible entities have not yet had correlations recently calculated.

As represented by block 2020, the processing system 120 then determines the number of entitlements that the first and second entitlement-eligible entities have in common. As represented by block 2030, the processing system 120 also determines the number of entitlements that the first entitlement-eligible entity has but the second entitlement-eligible entity does not have. As represented by block 2040, the processing system 120 also determines the number of entitlements that the second entitlement-eligible entity has but the first entitlement-eligible entity does not have.

As represented by block 2050, the processing system 120 then calculates a correlation value by multiplying the number of entitlements that the first and second entitlement-eligible entities have in common by two, and then subtracting from this product the number of entitlements that only the first entity has and the number of entitlements that only the second entity has. In other words, in one embodiment, correlation between two entities is calculated according to the following equation:

$$\text{Correlation}=(2*\text{entitlements in common})-(\text{entitlements only the first entity has})-(\text{entitlements only the second entity has})$$

In other embodiments of the invention, however, the processing system 120 may use other equations that are functions of the number/percentage of entitlements that the entities have in common with each other and/or the number/percentage of entitlements that the entities do not have in common with each other. In some embodiments of the invention, the correlation value is normalized using statistical techniques known in the art, as will be apparent to a person having ordinary skill in the art in view of this disclosure.

In some embodiments of the invention, the correlation equations may be modified somewhat in order to weight some entitlements more than others. For example, in some organizations, there may be some basic low-risk entitlements that are assigned to all or many entities within the organization. In such embodiments, these entitlements or the number of these entitlements may be multiplied by some weighting factor in order to discount the fact that two entities being compared share these low-risk and common entitlements. For example, in one embodiment, these low-risk entitlements are not counted at all in the correlation equation.

Similarly, in some organizations, there may be some high-risk entitlements that are assigned to very few entities within the organization. In such embodiments, these entitlements or the number of these entitlements may be multiplied by some weighting factor in order to increase their impact on the correlation calculation. For example, in one embodiment, these entitlements are counted twice in the correlation equation.

FIG. 21 illustrates a simplified example of a correlation matrix 2100 in accordance with an embodiment of the invention. The correlation matrix 2100 is a matrix of values showing the correlation of entitlements for every combination of two entities in a group of entitlement-eligible entities. For example, correlation value 2110 is a measure of the how well the combination of entitlements associated with Entity B correlate with the combination of entitlements associated with Entity A, and vice versa since the matrix is symmetrical. In one embodiment, the values in the correlation matrix 2100 are calculated using the procedure described above with reference to FIG. 20. When using the example algorithm described in FIG. 20, the values on the diagonal of the matrix 2100, such as value 2120, represent the highest correlation value for the corresponding entity. When using the example correlation algorithm, this value is two times the number of entitlements associated with the corresponding entity. It will be appreciated that, in other embodiments of the invention, different correlation calculations may be used and the values may be normalized according to certain known statistical algorithms.

FIG. 22 illustrates a process 2200 of generating dynamic communities based on the correlation matrix 2100 or a similar correlation matrix, in accordance with an embodiment of the invention. As represented by block 2210, the processing system 120 uses a correlation equation, such the equation described in FIG. 20, to create a correlation matrix, such as the matrix 2100 illustrated in FIG. 21, for all of the entitlement-eligible entities within an organization or for some other group of entitlement-eligible entities.

As represented by block 2220, the processing system 120 then selects an entitlement-eligible entity within the organization or other group. As represented by block 2230, the processing system 120 then captures all of the entitlement-eligible entities having a correlation with the selected entitlement-eligible entity greater than a threshold correlation value. The threshold correlation value may be predefined and/or entered by a user, or the threshold correlation value may be based on a statistical analysis of the correlation values in the matrix, such as based on a mean or median correlation value for the selected entity or a distance measured therefrom. The threshold correlation value may be stored in the memory of the computing device 105 in the normalcy factors datastore 114. Likewise, the correlation matrix and/or other calculated correlation values may be stored in the memory of the computing device 105 as illustrated in FIG. 2.

As represented by block 2240, the processing system 120 then creates a "dynamic community" of the selected entitlement-eligible entity and any entitlement-eligible entities captured in step 2230. As represented by block 2250, the processing system 120 then selects another entitlement-eligible entity in the organization and then repeats steps 2230 and 2240 to generate another dynamic community. This is then repeated until all entities are considered. In one embodiment, the processing system 120 checks and removes and duplicate or substantially duplicative communities.

FIG. 23 illustrates another process 2300 for generating dynamic communities, in accordance with another embodiment of the invention. As represented by block 2310, in this process 2300 a "feed" entity is selected as a first member of a new community. In one embodiment of the invention, the feed entity is selected, either automatically by the processing system 120 or manually by a user of the entitlement managing system 110, based on an indication that this entity may be a good representative of a particular community within the organization. This indication may be based on, for example, a determination that the entity's combinations of entitlements correlate with many entities in the organization. In some embodiments, two or more feed entities are selected.

As represented by block 2320, the processing system 120 then calculates how well each entity in the organization that is not yet a member of the new community correlates with the current members of the new community. As represented by block 2320, the processing system 120 then selects any entities that are not yet in the new community but that have correlation values calculated in step 2320 that are greater than some defined correlation threshold. As represented by block 2340, any entities selected in step 2330 are then added to the new community.

As represented by decision diamond 2345, the processing system 120 then considers whether any entities were added to the new community during step 2340 and, if there were entities added, proceeds to step 2320 where the correlation values are then calculated again to see how well the remaining entities not in the new community correlate with the members of the new community now that new members have been added. The steps described in 2320, 2330, 2340, and 2345 are repeated until no new entities are added to the new community. When this point is reached, the processing system 120 proceeds to the step described in block 2350 where the members currently in the new community are identified as a community in the organization. This community information 116 is stored in the memory of the computing device 105.

FIG. 24 illustrates yet another process 2400 for generating dynamic communities, in accordance with another embodiment of the invention. As represented by block 2410, in this process 2400 a "centroid" or "pseudo-entity" is created based, for example, on user input. The pseudo-entity may be an imaginary entity or a profile not associated with any particular person (i.e., a "dummy" profile). A user of the entitlement managing system 110 assigns some combination of entitlements to the pseudo-entity that will be representative of a community that the user is interested in identifying. For example, the user may know or suspect that the combination of entitlements A, F, G, and Z is representative of a particular role in the organization that crosses job titles, lines of business, practice groups, divisions, and other traditional boundaries in the organization. The user may define a pseudo-entity having entitlements A, F, G, and Z by entering input into the entitlement managing system 110 and the entitlement managing system 110 will generate a community of entities within the organization that correlate well with this pseudo-entity.

As represented by block 2420, the processing system 120 then calculates how well each entity in the organization that correlates with the pseudo-entity. For example, in one embodiment of the invention, the correlation equation described above is used to create a correlation matrix. In other embodiments of the invention, other correlation equations or techniques may be used, as will be apparent to a person having ordinary skill in the art in view of this disclosure.

As represented by block 2430, the processing system 120 then selects any entities that have correlation values calculated in step 2430 that are greater than some defined correlation threshold. In some embodiments of the invention, other techniques may be used to determine correlation, such as using a vector distance calculation to determine how far each entitlement-eligible entity is in some n-dimensional space from the pseudo-entity or centroid. In such an embodiment, the correlation threshold may include a maximum vector length or distance from the centroid/pseudo-entity that defines a community as any entity being a shorted distance from the centroid/pseudo-entity than the maximum vector length/distance.

As represented by block 2440, any entities selected in step 2430 are then defined as a community. This community information 116 is stored in the memory of the computing device 105 where it can be used, for example, to identify uncommon and/or normal entitlements and/or entitlement-eligible entities as described herein. The process 2400 is then repeated to create other dynamic communities within the organization.

FIG. 2500 illustrates an example of a correlation matrix 2500 calculated during the process 2400 described in FIG. 24, in accordance with an embodiment of the invention. In this example, a correlation equation was used that normalizes the correlation values so that they all fall between zero and one, with zero representing no correlation of entitlements between the two entities and one representing complete correlation of entitlements between the two entities. It should be noted that the numbers illustrated in this example matrix 2500 or not necessarily accurate and are, instead used to illustrate the concept of the correlation matrix, pseudo-entities, and how a correlation matrix may look in some embodiments of the invention.

Unlike the correlation matrix 2100 illustrated in FIG. 21, the correlation matrix 2500 illustrated in FIG. 25 is not symmetrical since it compares a plurality of pseudo-entities with a plurality of real entities. Each box in the matrix 2500 includes a calculated value representing how well the combination of entitlements associated with an entitlement-eligible entity in the organization correlates with the combination of entitlements assigned to the pseudo-entity. As described in FIG. 24, a dynamic community may be identified by looking at a row of the matrix and selecting each entity that has a correlation value greater in that row greater than some threshold value. For example, supposing that the threshold value for the community represented by Pseudo-Entity T is 0.50, then Entities B, C, and D, would represent a certain dynamic community 2510 at this point in time.

Using "Likelihood Ratios" to Determine Uncommon and/or Normal Entities

The generation of dynamic communities that cross traditionally boundaries defined in an organization can also allow an entitlement manager to determine entities that should be reviewed by identifying normal and/or uncommon entities in a dynamic community. For example, supposing that a pseudo-entity is created having entitlements that represent access to some of the most confidential databases in a bank. A dynamic community may then be created using this pseudo-entity and the processes described above. If the resulting dynamic community includes a lot of high-level executives and other personnel specifically involved with those databases, but also includes a single bank teller, then this may indicate a risk in the bank. In one embodiment, the processing system 120 would, after generating the dynamic community, automatically flag the bank teller in the dynamic community for review by entitlement management personnel at the bank. The entitlement management personnel would then look into the bank teller's access in more detail to make sure, for example, that the bank teller is not engaged in criminal or risky activity, has not received the entitlements in error, has not received the entitlements consistent with a policy that needs to change, or the like.

For example, FIG. 26 illustrates a process 2600 for using dynamic communities to determine "normal" and/or "uncommon" entitlement-eligible entities within a community, in accordance with one embodiment of the invention. As described above, in some embodiments of the invention, one or more dynamic communities are generated by the entitlement managing system 110 based on the distribution of entitlements within an organization. As represented by block 2610, a dynamic community is selected. In some embodiments of the invention, a user selects a community using a user input device and the input is used by the processing system 120 to retrieve information 116 about the selected community. In other embodiments, the community is selected automatically by the processing system 120. For example, the processing system 120 may periodically perform the process 2600 for each community within the organization.

As represented by block 2620, an entity type existing within the selected organization is selected. As used herein, an entity type may be any characteristic used to identify a certain classification of entitlement-eligible entity. This may be, for example, a job or hierarchy code, job title, practice group, project, line of business, or other indicator of an entity's role in the organization. In one embodiment of the present invention, the processing system 120 identifies all of the entity types that are currently represented in the selected dynamic community and begins by selecting one of these entity types. In another embodiment of the invention, a user of the entitlement managing system 110 selects the entity type.

As represented by block 2630, the processing system 120 then calculates an indicator of the number of entities in the selected dynamic community that have the selected entity type, or the processing system 120 calculates an indicator of the likelihood of the selected entity type being represented in the selected dynamic community relative to, for example, the organization in general. For example, in one embodiment, where the selected entity type is a bank teller, the processing system 120 may count the number of bank tellers in the dynamic community, calculate the percentage of the dynamic community members that are bank tellers, and/or compute the likelihood of a bank teller existing within the selected dynamic community relative to the organization in general.

In embodiments of the invention where a likelihood indicator is calculated, the processing system 120 may, for example, calculate a likelihood ratio as illustrated by blocks 2632, 2634, and 2636 in FIG. 26. In one embodiment, this calculation involves the processing system 120 calculating a "likelihood ratio" according to the following equation:

Likelihood Ratio=(% in community of the selected entity type)/(% outside community of the selected entity type)

More particularly, as represented by block 2632, the processing system 120 uses the information 116 stored about current dynamic communities to determine the percentage of entitlement-eligible entities within the community are of the selected entity type. As represented by block 2634, the processing system 120 also uses the information 116 stored about the organization generally outside of the selected dynamic community to determine the percentage of entitlement-eligible entities outside the community that are of the selected entity type. As represented by block 2636, the processing system 120 then calculates the likelihood ratio by dividing the percentage of entitlement-eligible entities within the community that are of the entity type by the percentage of entitlement-eligible entities outside the community that are of the entity type. The calculated likelihood ratio is then stored along with the selected dynamic community and the entitlement in the likelihood ratio datastore 129 in the entitlement managing system's memory. In one embodiment, the steps represented by blocks 2620 and 2630 are repeated for all of the entity types represented in the selected community.

As represented by block 2650, the calculated indicator(s) from step 2630 are then used by the processing system 120 and/or a user of the entitlement managing system 110 to determine which entitlement-eligible entities in the selected community are normal and/or uncommon, as these terms are defined above. These determinations are then used to drive entitlement reviews and/or, in some embodiments, to prompt automatic action such as the adding, suspending, or removing of entitlements from an entity. For example, FIG. 27 illustrates a process 2700 for using the indicators to determine which entitlement-eligible entities are "uncommon" in a community, in accordance with an embodiment of the invention. Similarly, FIG. 28 illustrates a process 2800 for using the indicators to determine which entitlement-eligible entities are "normal" in a community, in accordance with an embodiment of the invention.

As illustrated by block 2710 in FIG. 27, the processing system 120 receives or accesses information regarding the indicators for each entitlement-eligible entity within the selected dynamic community. As illustrated by block 2720, the processing system 120 also receives input regarding an uncommon entity threshold. The uncommon entity threshold may be provided by a user and stored in the normalcy factor datastore 114 in the memory of the computing device 105. In one embodiment of the invention, the uncommon entity threshold is community-specific. In other embodiments of the invention, however, the same uncommon entity threshold is used when analyzing all of the different dynamic communities in an organization. In one embodiment, the uncommon entity threshold entered by the user is an integer or other number representing the number, percentage or likelihood ratio value within the selected community in order for an entity not to be considered uncommon. For example, in one embodiment, the uncommon entity threshold is the number "one." Using the equation for likelihood ratio described above, an entity having a likelihood ratio of "one" means that the entity is no more or less likely to exist within or outside of the community. However, a value greater than one indicates that the entity is more likely to exist within the community than outside the community, and a value less than one indicates that the entity is less likely to exist within the community than outside the community (which may indicate a risk and/or inappropriate entitlement assignments for this entity). Therefore, a likelihood ratio value greater than one is more likely to indicate a normal entity for that community and a likelihood ratio value less than one is more likely to indicate an uncommon entity for that community.

In still other embodiments, the uncommon entity threshold is automatically computed by the processing system 120 based on a statistical analysis of the distribution of indicator values within the community and/or other communities. For example, the uncommon entity threshold may be computed as being the number, percentage, likelihood ratio, or other indicator value that is some "x" number of standard deviations below the mean indicator value for the community or the organization.

As illustrated by block 2730, the processing system 120 analyzes each entitlement-eligible entity within the community to determine any and all entitlement-eligible entities in the community having an indicator value less than the uncommon entity threshold. As illustrated by block 2740, any entitlements in the community where the indicator value is less than the uncommon entity threshold are flagged as "uncommon" entities within the community so that these members may be analyzed more closely to determine whether or not they should have access to their current combination of entitlements. Information regarding which entities are uncommon in the community is stored in an uncommon entity datastore 123 on the computing device 105 or some other computing device.

Referring now to FIG. 28, the processing system 120 similarly determines, based on the indicator values calculated for the entities in the selected dynamic community, which entities are "normal" within the community. More particularly, as illustrated by block 2810 in FIG. 13, the processing system 120 receives or accesses information regarding the indicator values for each entitlement-eligible entity within the selected dynamic community. As illustrated by block 2820, the processing system 120 also receives input regarding a normal entity threshold. The normal entity threshold may be provided by a user and stored in the normalcy factor datastore 114 in the memory of the computing device 105. In one embodiment of the invention, the normal entity threshold is community-specific. In other embodiments of the invention, however, the same normal entity threshold is used when analyzing all of the different communities in an organization. In one embodiment, the normal entity threshold is an integer or other number representing the minimum indicator value within the selected community in order for an entity to be considered normal. In some embodiments, the normal entity threshold is automatically computed by the processing system 120 based on a statistical analysis of the distribution of indicator values within the community and/or other communities. For example, the normal entity threshold may be computed as being the indicator value that is some "x" number of standard deviations above or below the mean indicator value for the community or the organization.

As illustrated by block 2830, the processing system 120 analyzes each entitlement-eligible entity within the dynamic community to determine any and all entities in the community having an indicator value greater than the normal entity threshold. As illustrated by block 2840, any entities in the community where the indicator is greater than the normal entity threshold are flagged as "normal" entities within the community and, therefore, may not need to be reviewed. In one embodiment of the invention, any entitlement-eligible entities not being determined to be normal may also be flagged so that these members may be analyzed more closely to determine whether or not they should have access to their current combination of entitlements. Information regarding which entities are normal in the community is stored in a normal entity datastore 121 on the computing device 105 or some other computing device.

In some embodiments, the normal entity threshold and the uncommon entity threshold are the same; however, in some embodiments the normal and uncommon thresholds will be different with some entities falling into a third category of entities that are not unlikely enough to be considered "uncommon," but are also not likely enough to be considered "normal" cornerstone-type entities in the community either.

Embodiments of the present invention can be implemented as a computer-aided method, as a system, as computer instruction codes, as an apparatus and/or combinations of any of the above. Some of the claims of the application may be drafted in means-plus-function format. While the means recited in these claims can be implemented by any number of systems, devices, computer program code, etc., provided below are examples of structural systems that may meet the functions outlined by the recited means.

For example, a processing means for selecting a group of members in the organization that have similar job functions and for determining whether any members of the group have access to information or resources that some predetermined amount of the members in the group do not have access to, etc., can be implemented as a processor or general computing element that uses software code instructions to perform these functions. The processor could, as an alternative, be an application specific IC chip that is hard-wired to perform the stated functions. The various means could also be met by a distributed network of processing elements that perform various portions of the recited functions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will appreciate, in view of this disclosure, that different embodiments of the invention described herein may be combined to form other embodiments of the invention.

What is claimed is:

1. A system comprising:
a memory device having stored therein information regarding a plurality of entitlement-eligible entities and information regarding one or more entitlements currently associated with each entitlement-eligible entity; and
a processing device in communication with the memory device, wherein the processing device:
determines different communities of entitlement-eligible entities based on a review of the one or more entitlements currently associated with at least some of the entitlement-eligible entities, wherein determining the different communities comprises:
selecting a plurality of combinations of two entitlement-eligible entities from the plurality of entitlement-eligible entities;
determining for each of the selected plurality of combinations of two entitlement-eligible entities a correlation number, wherein the correlation number indicates how well the entitlements associated with one entitlement-eligible entity of a combination of two entitlement-eligible entities correlate to the entitlements associated with the other entitlement-eligible entity of the combination of two entitlement-eligible entities, wherein the correlation number for the combination of two entitlement-eligible entities is computed as a function of a number of entitlements that the two entitlement-eligible entities have in common and a number of entitlements that the two entitlement-eligible entities do not have in common;
determines a community of entitlement-eligible entities based on the correlation number for the combination of two entitlement-eligible entities selected from the plurality of entitlement eligible-entities;
selects a community of entitlement-eligible entities from the different communities;
calculates a likelihood ratio for at least one of the entitlements currently associated with one or more entitlement-eligible entities within the selected community, wherein the likelihood ratio indicates whether the at least one of the entitlements requires validation or not; and
determines based on the likelihood ratio that the entitlement is uncommon if the likelihood ratio is below an uncommon entitlement threshold or the entitlement is normal if the likelihood ratio is equal to or above the uncommon entitlement threshold, wherein an uncommon entitlement is an entitlement requiring validation, and wherein a normal entitlement is an entitlement that does not require validation.

2. The system of claim 1, wherein the processing device is configured to determine a community of entitlement-eligible entities based on a review of the one or more entitlements that each entitlement-eligible entity has in common with other of the plurality of entitlement-eligible entities.

3. The system of claim 1, wherein the processing device is configured to compute the correlation number by multiplying the number of entitlements that the two entitlement-eligible entities have in common by two and then subtracting therefrom the number of entitlements that the two entitlement-eligible entities do not have in common.

4. The system of claim 1, wherein the processing device generates a correlation matrix showing entitlement correlations for each combination of a plurality of entitlement-eligible entities, and wherein the processing device uses the correlation matrix to generate a plurality of different communities of entitlement-eligible entities.

5. The system of claim 4, wherein the processing device is configured to generate a community of entitlement-eligible entities by selecting an entitlement-eligible entity and selecting all entitlement-eligible entities in the selected entitlement-eligible entity's row in the correlation matrix that have a correlation above a defined correlation threshold.

6. The system of claim 1, wherein the processing device is configured to periodically re-determine different communities of entitlement-eligible entities based on a review of the one or more entitlements currently associated with each entitlement-eligible entity at the time of the periodic re-determination.

7. The system of claim 1, wherein the processing device is configured to mark an uncommon entitlement for a higher priority of review relative to other entitlements not determined to be uncommon entitlements.

8. A system comprising:
a memory comprising information stored therein about the distribution of entitlements to a plurality of entities within an organization; and
a processor uses the information stored in the memory to identify a portion of the plurality of entities based on the distribution of entitlements within the organization, wherein the processor is configured to store information in the memory identifying the portion of the plurality of entities as a community, wherein identifying the portion of the plurality of entities as the community comprises:

selecting a plurality of combinations of two entities from the plurality of entities within the organization;

determining for each of the selected plurality of combinations of two entities a correlation number, wherein the correlation number indicates how well entitlements associated with one entity of a combination of two entities correlates to the entitlements associated with the other entity of the combination of two entities, wherein the correlation number for the combination of two entities is computed as a function of a number of entitlements that the two entities have in common and a number of entitlements that the two entities do not have in common;

determining a community of entities based on the correlation number for the combination of two entities selected from the plurality of entities;

selecting a community of entities;

calculating a likelihood ratio for at least one of the entitlements currently associated with one or more entities within the selected community, wherein the likelihood ratio indicates whether the at least one of the entitlements requires validation or not; and determining based on the likelihood ratio that the entitlement is uncommon if the likelihood ratio is below an uncommon entitlement threshold or the entitlement is normal if the likelihood ratio is equal to or above the uncommon entitlement threshold, wherein an uncommon entitlement is an entitlement requiring validation, and wherein a normal entitlement is an entitlement that does not require validation.

9. The system of claim 8, wherein the memory comprises information about a pseudo-entity having a combination of entitlements associated therewith, and wherein the processor is configured to identify the portion of the plurality of entities based on a review of the one or more entitlements that each entity of the plurality of entities has in common with the pseudo-entity.

10. The system of claim 9, wherein the combination of entitlements associated with the pseudo-entity is based on user input comprising user-selected entitlements.

11. The system of claim 9, wherein, for each combination of an entity of the plurality of entities and the pseudo-entity, the processor is configured to compute a correlation number representing how well the entitlements associated the entity of the plurality of entities correlate with the combination of entitlements associated with the pseudo-entity, and wherein the processor identifies the portion of the plurality of entities based on the correlation number.

12. The system of claim 8, wherein the information stored in the memory about the distribution of entitlements to the plurality of entities within an organization is updated in real time or near-real time.

13. The system of claim 8, wherein the processor is configured to mark an uncommon entitlement for a higher priority of review relative to other entitlements not determined to be uncommon entitlements.

14. The system of claim 8, wherein the memory comprises information about the entity type for each of the plurality of entities, and wherein the processor is configured to identify entity types requiring a higher priority review relative to other entity types in the community.

15. The system of claim 14, wherein the processor is configured to mark an entity type requiring a high priority review relative to other entities not determined to be requiring the high priority review in the community.

16. The system of claim 8, wherein the memory comprises information about the entity type for each of the plurality of entities, wherein the processor is configured to determine, for each entity type represented in the community, an indicator of the amount or likelihood of each entity type in the community based on a review of the one or more entity types currently represented within the community, and wherein the processor is configured to determine one or more uncommon entity types based on whether each entity type's indicator is below an uncommon entity type threshold, wherein an uncommon entitlement is an entitlement requiring validation, and wherein a normal entitlement is an entitlement that does not require validation.

17. A computer-implemented method for managing the distribution of entitlements within an organization, said method comprising:

providing information regarding a plurality of members in the organization and the entitlements that are currently associated with each member;

providing a computer processor executing computer readable code structured to cause the computer to:

group members from the plurality of members to determine one or more communities based on a review of the one or more entitlements currently associated with at least some of the plurality of members, wherein determining the one or more communities comprises:

selecting a plurality of combination of two members in the organization;

determining for each of the selected plurality of combinations of two members a correlation number, wherein the correlation number indicates how well the entitlements associated with one member of a combination of two members correlate to the entitlements associated with the other member of the combination of two members, wherein the correlation number for the combination of two members is computed as a function of a number of entitlements that the two members have in common and a number of entitlements that the two members do not have in common;

store in a memory the one or more communities and information about which of the plurality of members are in each of the one or more communities; and select a community of members from the one or more communities;

calculate a likelihood ratio for at least one of the entitlements currently associated with one or more members within the selected community, wherein the likelihood ratio indicates whether the at least one of the entitlements requires validation or not; and determining based on the likelihood ratio that the entitlement is uncommon if the likelihood ratio is below an uncommon entitlement threshold or the entitlement is normal if the likelihood ratio is equal to or above the uncommon entitlement threshold, wherein an uncommon entitlement is an entitlement requiring validation, and wherein a normal entitlement is an entitlement that does not require validation.

18. The computer-implemented method of claim 17, further comprising computer processor executing computer readable code structured to cause the computer to:

creating a pseudo-member having a combination of entitlements associated therewith; and grouping, using the processor, a portion of the plurality of members into a community based on a review of the one or more entitlements that each member of the plurality of members has in common with the pseudo-member.

19. The computer-implemented method of claim 18, further comprising computer processor executing computer readable code structured to cause the computer to:
  using user input to select the combination of entitlements associated with the pseudo-member.

20. The computer-implemented method of claim 18, wherein, for each combination of a member of the plurality of members and the pseudo-member, the processor is configured to compute a correlation number representing how well the entitlements associated the member of the plurality of members correlate with the combination of entitlements associated with the pseudo-member, and wherein the method further comprises:
  grouping a portion of the plurality of members into a community based on the correlation number.

21. The computer-implemented method of claim 17, further comprising computer processor executing computer readable code structured to cause the computer to:
  providing information about the member type for each of the plurality of members;
  determining an indicator of an amount or likelihood of each member type in a community based on a review of the one or more member types currently represented within the community;
  determining one or more uncommon member types based on whether each member type's indicator is below an uncommon member type threshold; and
  marking a member in the community that is associated with the one or more uncommon member types, wherein an uncommon entitlement is an entitlement requiring validation, and wherein a normal entitlement is an entitlement that does not require validation.

22. The computer-implemented method of claim 17, further comprising computer processor executing computer readable code structured to cause the computer to:
  selecting a community from the one or more communities;
  analyzing the entitlements that are currently associated with the members of the selected community to determine, for each entitlement in the selected community, the number of members in the selected community that are currently associated with each entitlement;
  determining whether the number of members in the selected community that are currently associated with each entitlement is below a certain threshold;
  identifying the members in the selected community associated with entitlements below the threshold; and
  determining whether the entitlements below the threshold associated with the identified members require validation or not prior to removing the entitlement.

23. The computer-implemented method of claim 17, further comprising computer processor executing computer readable code structured to cause the computer to:
  selecting a community from the one or more communities;
  analyzing the entitlements that are currently associated with the members of the selected community to determine, for each entitlement in the selected community, the number of members in the selected community that are currently associated with each entitlement;
  determining whether the number of members in the selected community that are currently associated with each entitlement is above a certain threshold;
  identifying the members in the selected community not associated with entitlements above the threshold; and
  determining whether the entitlements above the threshold associated with the identified members require validation or not prior to providing the entitlement to the identified members.

24. The computer-implemented method of claim 23, further comprising computer processor executing computer readable code structured to cause the computer to:
  automatically distributing entitlements in the community that are above the threshold to the members in the selected community that are not associated with the entitlements above the threshold.

* * * * *